United States Patent
Hagen et al.

(10) Patent No.: US 12,400,181 B2
(45) Date of Patent: Aug. 26, 2025

(54) MOBILE APPARATUS WITH COMPUTER VISION ELEMENTS FOR CLASSIFYING SHELF-SPACE

(71) Applicant: Target Brands, Inc., Minneapolis, MN (US)

(72) Inventors: Todd A. Hagen, Minneapolis, MN (US); Donnie Tolbert, Minneapolis, MN (US); Arne Wilkin, Minneapolis, MN (US); John Ojanen, Minneapolis, MN (US); Nicholas Lojewski, Minneapolis, MN (US); Yeshwanth Gowda, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 395 days.

(21) Appl. No.: 18/079,210

(22) Filed: Dec. 12, 2022

(65) Prior Publication Data

US 2023/0245058 A1    Aug. 3, 2023

Related U.S. Application Data

(60) Provisional application No. 63/299,481, filed on Jan. 14, 2022.

(51) Int. Cl.
*G06Q 10/087*    (2023.01)
*G06F 18/241*    (2023.01)
(Continued)

(52) U.S. Cl.
CPC ......... *G06Q 10/087* (2013.01); *G06F 18/241* (2023.01); *G06K 7/1443* (2013.01);
(Continued)

(58) Field of Classification Search
CPC .. G06Q 10/087; G06F 18/241; G06K 7/1443; G06V 10/764; G06V 10/774;
(Continued)

(56) References Cited

U.S. PATENT DOCUMENTS

| 8,630,924 B2 | 1/2014 | Groenevelt et al. |
| 9,536,167 B2 | 1/2017 | Schwartz |

(Continued)

FOREIGN PATENT DOCUMENTS

WO    WO2006/040687    4/2006

OTHER PUBLICATIONS

Saqlain, M., Rubab, S., Khan, M. M., Nouman, A., & Ali, S. (2022). Hybrid approach for shelf monitoring and planogram compliance (hyb-SMPC) in retails using deep learning and computer vision. Mathematical Problems in Engineering, 2022 doi:https://doi.org/10.1155/2022/4916818 (Year: 2022).*

*Primary Examiner* — Ashford S Hayles
(74) *Attorney, Agent, or Firm* — Barnes & Thornburg LLP

(57) ABSTRACT

Disclosed are systems and techniques for determining out of stock conditions on shelves. The techniques can include receiving, by a computing system, image data from a camera having pixel locations that each uniquely address and store a pixel value, generating a backing map having cell locations that each uniquely address and share a unique address with a corresponding pixel location in the image data, each cell location storing a backing value being an empty value if the pixel value is classified as showing the backing of a shelf and the backing value being a nonempty value if the pixel value is classified as not showing the backing of the shelf, determining, in the backing map, a shelf area representing a location of the captured shelf, and identifying an empty area (Continued)

by finding an area above the shelf area containing a threshold number of cell locations storing the empty value.

20 Claims, 18 Drawing Sheets

(51) Int. Cl.
    *G06K 7/14* (2006.01)
    *G06V 10/764* (2022.01)
    *G06V 10/774* (2022.01)
    *G06V 20/50* (2022.01)
    *H04N 23/667* (2023.01)
    *H04N 23/695* (2023.01)

(52) U.S. Cl.
    CPC .......... *G06V 10/764* (2022.01); *G06V 10/774* (2022.01); *G06V 20/50* (2022.01); *H04N 23/667* (2023.01); *H04N 23/695* (2023.01)

(58) Field of Classification Search
    CPC ...... G06V 20/50; G06V 20/52; H04N 23/667; H04N 23/695; H04N 23/61
    See application file for complete search history.

(56) References Cited

U.S. PATENT DOCUMENTS

| | | | |
|---|---|---|---|
| 9,996,818 B1 | 6/2018 | Ren et al. | |
| 10,176,452 B2 | 1/2019 | Rizzolo et al. | |
| 10,289,990 B2 | 5/2019 | Rizzolo et al. | |
| 10,373,116 B2* | 8/2019 | Medina | B25J 9/1697 |
| 10,726,273 B2 | 7/2020 | Phan et al. | |
| 11,748,702 B2* | 9/2023 | Liu | G06Q 10/087 |
| | | | 705/28 |
| 2008/0077511 A1* | 3/2008 | Zimmerman | G06Q 10/087 |
| | | | 705/28 |
| 2012/0121209 A1* | 5/2012 | Li | G06T 7/11 |
| | | | 382/307 |
| 2015/0052029 A1* | 2/2015 | Wu | G06Q 10/087 |
| | | | 705/28 |
| 2015/0117788 A1* | 4/2015 | Patel | G06F 18/2321 |
| | | | 382/199 |
| 2015/0269440 A1* | 9/2015 | Lund | H04N 23/66 |
| | | | 348/158 |
| 2015/0363758 A1* | 12/2015 | Wu | G06T 7/74 |
| | | | 705/20 |
| 2016/0171336 A1* | 6/2016 | Schwartz | G06F 18/23 |
| | | | 382/173 |
| 2016/0171707 A1* | 6/2016 | Schwartz | G06F 18/22 |
| | | | 382/180 |
| 2016/0224857 A1* | 8/2016 | Zhang | G06F 18/253 |
| 2017/0193434 A1* | 7/2017 | Shah | G05D 1/0212 |
| 2018/0060803 A1* | 3/2018 | Cheruku | G06V 20/52 |
| 2018/0107999 A1* | 4/2018 | Rizzolo | G06T 7/73 |
| 2018/0108134 A1* | 4/2018 | Venable | G06T 7/521 |
| 2019/0034864 A1 | 1/2019 | Skaff et al. | |
| 2019/0043003 A1* | 2/2019 | Fisher | G06V 10/82 |
| 2019/0108474 A1* | 4/2019 | Tripathi | G01L 1/22 |
| 2019/0236530 A1* | 8/2019 | Cantrell | G06V 40/23 |
| 2020/0184411 A1 | 6/2020 | Shah et al. | |
| 2021/0117918 A1* | 4/2021 | Bogolea | H04N 7/181 |
| 2021/0125258 A1* | 4/2021 | Mirza | G06T 7/73 |
| 2021/0125365 A1* | 4/2021 | Mirza | G01G 19/4144 |
| 2021/0216954 A1* | 7/2021 | Chaubard | G06Q 10/087 |
| 2021/0406813 A1* | 12/2021 | Liu | G06Q 10/087 |
| 2022/0114617 A1* | 4/2022 | Li | G06Q 10/087 |
| 2022/0284384 A1* | 9/2022 | Chaubard | G06V 20/52 |

* cited by examiner

MOBILE APPARATUS WITH COMPUTER VISION ELEMENTS FOR CLASSIFYING SHELF-SPACE

CROSS-REFERENCE TO RELATED APPLICATIONS

This application claims the benefit of U.S. Application Ser. No. 63/299,481, filed on Jan. 14, 2022. The disclosure of the prior application is considered part of (and is incorporated by reference in) the disclosure of this application.

TECHNICAL FIELD

This document generally relates to technology for computer vision processing for detecting inventory conditions, such as determining if a shelf in a retail store is empty.

BACKGROUND

Computer vision tasks include operations for acquiring, processing, analyzing and understanding digital images, and extraction of high-dimensional data from the real world in order to produce numerical or symbolic information, e.g. in the forms of decisions. Understanding in this context includes the transformation of visual images (the input of the retina) into descriptions of the world that make sense to processes and can elicit appropriate action. This image understanding can be seen as the disentangling of symbolic information from image data using models constructed with the aid of geometry, physics, statistics, and learning theory. The image data can take many forms, such as video sequences, views from multiple cameras, multi-dimensional data from a 3D scanner, or medical scanning device.

Physical inventory or stock can include the physical goods and/or materials that a business currently has available for use, purchase, or consumption. For example, the physical inventory in a retail store can include the items that are either stocked on the store's shelves available for customers to purchase, or that are available in the store's stock room for restocking in instances of low or out of stock conditions on the shelves. Such physical inventory for a retails store may not include inventory items that have already been purchased by customers, and in some instances, may also exclude inventory items that have been gathered by customers (e.g., placed in shopping cart) but not yet purchased. Physical inventory can vary in other contexts, though.

SUMMARY

This document generally describes technology for more accurately, efficiently, and unobtrusively determining current stock levels of physical items on shelves with computer vision. For example, determining the current stock/inventory levels for physical items has been a long-standing challenge for entities, such as retail stores. Often it has involved performing manual counts of inventory that are available on shelves, but given the labor expense associated with that technique, such counts may not be possible to be performed frequently (e.g., performed once per day). Other techniques have involved specialized shelf equipment, such as sensors and other equipment capable of electronically detecting current inventory levels on shelves. However, such specialized equipment can be expensive to implement across a larger retail store, may require significant efforts to configure and maintain, and may be prone to malfunction/breaking in the event that customers, employees, vendors, or other relevant users disrupt the equipment. Other techniques have relied inventory tracking server systems that correlate data from manual inventory counts, restocking events, and item sales to determine current inventory levels. However, such server systems can often fail to account for human variation injected into a retail environment, such as when customers pick up an item from its designated shelf and place it somewhere else in the store, when customers pick up an item for purchase but have not yet checked out, and inventory shortage events (i.e., theft of items).

The disclosed technology can provide for more frequent and accurate inventory condition detection, such as out of stock conditions (e.g., no inventory items available in designated shelf location for item), over manual and server-based inventory tracking, and without the added expense and complexity of shelf equipment through the use of a mobile apparatus that can optically detect and identify inventory conditions for items in an environment, such as retail store, warehouse, or other appropriate physical environment. Such a mobile apparatus can be incorporated as part of, affixed to, or otherwise mounted on movable structures/apparatus/devices that are already present and frequently used in such environments, such as shopping carts, order picking carts, restocking carts, cleaning devices (e.g., floor sweeping/cleaning machines), and/or other movable structures/apparatus/devices-permitting for unobtrusive stock condition detection as the preexisting movable structures/apparatus/devices to which the mobile apparatus is part of/affixed/attached to is moved throughout an environment (e.g., moved throughout aisles of store) during any time of day (e.g., during hours while store is open, during hours while store is closed, etc.). Furthermore, such a mobile apparatus can accomplish this through the use of two different computer vision systems that are used in combination to first identify instances of inventory conditions (e.g., out of stock conditions, low inventory conditions, and/or other inventory conditions) and then second to determine specific physical products that correspond to those identified inventory conditions—permitting for accurate inventory condition detection in a manner that is computationally efficient and capable of real time processing by a relatively low power edge computing device (e.g., low processor capacity and memory, such as provided by a Raspberry Pi device).

For example, the disclosed technology can include using machine-learning classifiers to determine an image of a shelf shows the shelf to be empty or not. This process can including classifying the image, on a pixel-by-pixel basis, as either showing the back of the shelf area or not. For example, a store may have shelves for items, and behind the shelf may be a solid wall of a particular color, a pegboard, etc. When an image of the shelf and surrounding area is captured, each pixel can be classified by a classifier trained to identify the wall or object at the back of the shelf. The then, the process can identify areas of the shelf, areas of the items on the shelf, and areas where the back of the shelf is visible. In areas where the back of the shelf is visible, the process can identify this location as an empty shelf. Then, a message can be sent to an inventory management server with the location of the empty shelf. Instructions to restock the shelf can be generated, advantageously allowing for faster and more reliable inventory instructions.

One or more embodiments described herein can include an apparatus for determining an out of stock condition on a shelf, the apparatus including: a camera in data communication with one or more processors, the one or more processors, a mobile power source providing power to the camera and to the one or more processors, a network interface for sending and receiving messages with physically remote destinations over a data network, and computer memory storing instructions that, when executed by the one or more processors, cause the one or more processors to perform operations. The operations can include receiving image data from the camera that includes pixel locations, each pixel location being uniquely addressed in the image data and storing a pixel value captured by the camera at that location, generating a backing map including cell locations, each cell location being uniquely addressed in the backing map and sharing a unique address with a corresponding pixel location in the image data, each cell location storing a backing value being an empty value if the pixel value is classified as showing the backing of a shelf and the backing value being a nonempty value if the pixel value is classified as not showing the backing of the shelf, determining, in the backing map, a shelf area representing a location of a shelf captured by the camera, and identifying, in the backing map, an empty area by finding an area above the shelf area containing a threshold number of cell locations storing the empty value.

The embodiments described herein can optionally include one or more of the following features. For example, the operations further can include determining a shelf-identifier for a shelf that is empty of items based on the empty area in the backing map. The operations can also include identifying a barcode target area in the shelf area based on the location of the empty area and reading, in the image data, a barcode located in the image data based on the location of the barcode target area in the shelf area. The operations may also include transmitting to an inventory server system through the network interface an empty-shelf message that includes the shelf-identifier. Moreover, the operations can include generating, using the shelf-identifier, instructions to restock the shelf that is empty of items.

In some implementations, generating the backing map can include, for each cell location, accessing the pixel value of the corresponding pixel location with the cell location's unique address, generating a backing value by providing, to a classifier, the pixel value of the corresponding pixel location, receiving, from the classifier, the backing value, and recording, in the cell location, the backing value. Generating a backing value by providing, to a classifier, the pixel value of the corresponding pixel location further can include providing the image data and the unique address of the cell location, and the classifier can be configured to generate the backing value using a model that receives, as input, at least i) the pixel value of the corresponding pixel location and ii) other pixel values in the image data other than the pixel value of the corresponding pixel location based on the unique address. Moreover, generating a backing value by providing, to a classifier, the pixel value of the corresponding pixel location further can include providing a facility location that defines i) where in a facility the image data was captured and ii) item location data that specifies shelves in the facility and objects to be stored on the shelves in the facility, and the classifier can be configured to generate the backing value using a model that receives, as input, at least i) the pixel value of the corresponding pixel location and ii) objects to be stored near the facility location that defines where in a facility the image data was captured. The classifier can be a machine-learning classifier. The apparatus can be in data communication with a server system that can receive records of false-empty results, generate supplemental training data from the records of false-empty results and retrain the classifier using the supplemental training data. Retraining the classifier using the supplemental training data can include retraining, by the server system, the classifier using at least some original training data that was used to train the classifier in generating the false-empty results.

As another example, the apparatus can also include a fixed camera being fixedly mounted on the cart at a first angle, the camera can be a high resolution camera being controllably mounted on the cart, the high resolution camera can capture high resolution images and engage at least one of pan, tilt, and zoom operations in response to engagement instructions received from a high resolution camera controller, and a high resolution camera controller. The high resolution camera controller can receive high resolution camera instructions and responsive to receiving the high resolution camera instructions, send the engagement instructions to the high resolution camera. The operations can also include receiving, from the fixed camera, first image data that captures a first inventory object, determining, from the first image data, a spatial location of a first inventory object, generating high resolution camera instructions that are configured to cause the high resolution camera to capture the first inventory object, transmitting the high resolution camera instructions to the high resolution camera controller, and receiving, from the high resolution camera, the image data. Moreover, the high resolution camera can operate in multiple modes, the modes including at least i) a sleep mode and ii) a working mode in which the working mode can consume more power than the sleep mode, and the high resolution camera controller can transition, in response to receiving the high resolution camera instructions, the high resolution camera from the sleep mode to the working mode and to later transition the high resolution camera from the working mode to the sleep mode after the image data is received from the high resolution camera.

One or more embodiments described herein can include a method for determining an out of stock condition on a shelf, the method including receiving, by a computing system, image data from a camera having many pixel locations, each pixel location being uniquely addressed in the image data and storing a pixel value captured by the camera at that location, generating, by the computing system, a backing map having many cell locations, each cell location being uniquely addressed in the backing map and sharing a unique address with a corresponding pixel location in the image data, each cell location storing a backing value being an empty value if the pixel value is classified as showing the backing of a shelf and the backing value being a nonempty value if the pixel value is classified as not showing the backing of the shelf, determining, by the computing system and in the backing map, a shelf area representing a location of the shelf captured by the camera, and identifying, by the computing system and in the backing map, an empty area by finding an area above the shelf area containing a threshold number of cell locations storing the empty value.

The embodiments described herein can optionally include one or more of the following features. For example, the method can include determining, by the computing system, a shelf-identifier for a shelf that is empty of items based on the empty area in the backing map. The method can also include identifying, by the computing system, a barcode target area in the shelf area based on the location of the empty area and reading, by the computing system and in the image data, a barcode located in the image data based on the location of the barcode target area in the shelf area. The method may also include transmitting, by the computing system and to an inventory server system, an empty-shelf message that includes the shelf-identifier.

In some implementations generating, by the computing system, the backing map can include, for each cell location, accessing the pixel value of the corresponding pixel location with the cell location's unique address, generating a backing value by providing, to a classifier, the pixel value of the corresponding pixel location, receiving, from the classifier, the backing value, and recording, in the cell location, the backing value. The classifier can be a machine-learning classifier.

One or more embodiments described herein can include a system for determining an out of stock condition on a shelf, the system including one or more processors and computer memory storing instructions that, when executed by the one or more processors, cause the one or more processors to perform operations that include receiving image data having many pixel locations, each pixel location being uniquely addressed in the image data and storing a pixel value captured by a camera at that location, generating a backing map having many cell locations, each cell location being uniquely addressed in the backing map and sharing a unique address with a corresponding pixel location in the image data, each cell location storing a backing value being an empty value if the pixel value is classified as showing the backing of a shelf and the backing value being a nonempty value if the pixel value is classified as not showing the backing of the shelf, determining, in the backing map, a shelf area representing a location of the shelf captured by the camera, and identifying, in the backing map, an empty area by finding an area above the shelf area containing a threshold number of cell locations storing the empty value.

The systems, devices, program products, and processes described throughout this document can, in some instances, provide one or more of the following advantages. For example, a cart that is being moved through an environment for a primary reason such as storing a shopper's items or scrubbing the floor can be extended to unobtrusively and automatically perform inventory-monitoring tasks. By including cameras and data components, these tasks may be performed without any particular input needed from the user of the cart and can instead passively collect data. This can improve the use of the cart without imposing costs of complexity or attention on the user. By pushing computations related to inventory management to the network edge in the form of a fleet of carts, an inventory system can decentralize the data processing tasks, reducing the load on key, central components. Using high resolution cameras, which can generate images requiring more computational resources to process and may consume more power, only when lower resolution cameras initially identify an item of interest can allow the system to more efficiently use computational resources and to use less battery power than other configurations which may, instead, engage high resolution cameras at all times and for all tasks. This can be particularly beneficial for devices like carts which are usually not tethered to a power source and must instead carry batteries. By using small classifier models, few computing resources may be needed to classify pixels as showing an empty shelf area, further reducing the energy demands of the system and extending battery life.

In another example, the apparatus can be built on top of and integrated with existing in-store processes. Although the apparatus could be incorporated as part of an autonomous standalone robot, it is able to be incorporated into and used with existing devices in the store, such as a human-pushed cart, which can avoid introducing additional devices into stores, like a robot, that may block aisles or otherwise create obstacles for shoppers. Moreover, processing can be performed at the apparatus itself with edge computing, which can avoid clogging network bandwidth, increase efficiency, and use less RAM and processing power. The executable for image processing can also be small in size and more easily deployable at the controller of the apparatus.

DESCRIPTION OF DRAWINGS

Like reference symbols in the various drawings indicate like elements

DETAILED DESCRIPTION

As described above, this document describes technology that can identify inventory levels in storage areas like shelves or bins. Low-resolution cameras can capture low-resolution images of a shelf, and a controller can make an initial determination to identify possible areas where a background surface, instead of inventory items, is detected. The controller can instruct a high-resolution camera to capture images of the same area, and those high-resolution images can be used to analyze the area to identify the product with the detected inventory condition (e.g., out of stock level for product).

In some configurations, a cart can perform image analysis on hardware incorporated in the cart. This analysis can involves examining images of a shelf to determine if the back of the shelf is shown. If so, empty portions of the shelf can be identified by the cart, and a message can be sent from the cart to an inventory-management server alerting the server to the empty portions of the shelf.

Figure 1:
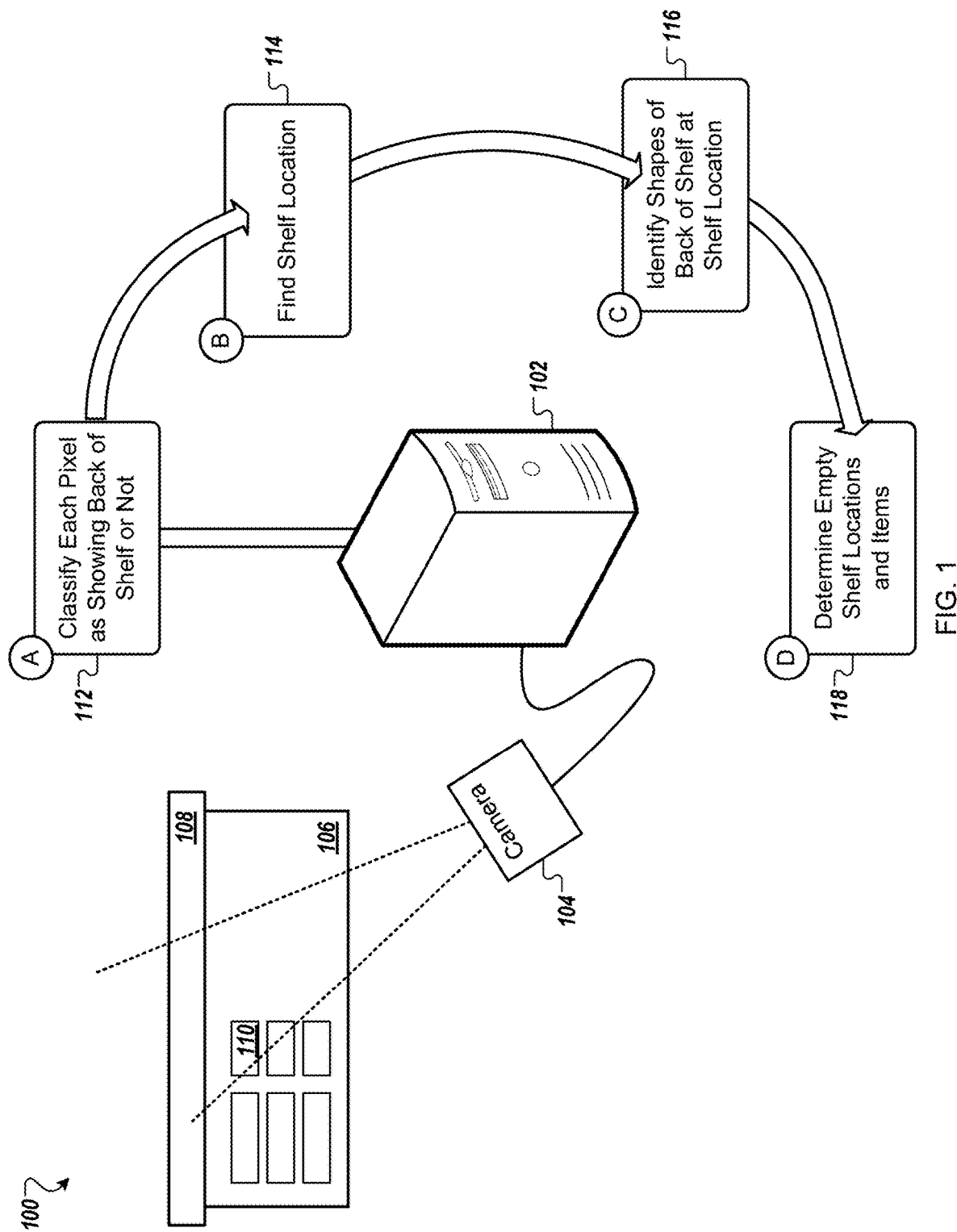
FIG. 1 shows an example system for analyzing images of shelves.

FIG. 1 shows an example system 100 for analyzing images of shelves. In the system 100, a computer system 102 uses computer vision to determine if a shelf has items on it, or if the shelf is empty. For example, the system 100 may be used in a retail environment such as a store or distribution center to automatically determine if a shelf is empty or not. In other examples, the system 100 may be used in one or more other environments in which inventory management on shelves can benefit from automated analysis (e.g., pharmacies with controlled substances, safety compliance in situations in which items must be returned to their storage location before dangerous operations can be executed, etc.).

The computer system 102 is connected to a camera 104 that captures images. The camera 104 may be a stationary camera or movable camera collecting monochromatic images or full color images. In the image, a shelf 106 is captured. In some portions of the image, the shelf is empty and the camera has an unconcluded view of backing 108. The backing may be, for example, a solid sheet, a pegboard, or other appropriate material. In addition, some portions of the image capture an item 110 (e.g., retail merchandise sitting on the shelf) where the shelf is not empty. In this case, since the backing 108 is occluded, the item 110 is captured in the image. As such, the image partially captures an empty shelf area and party captures a nonempty shelf area. Further examples of systems capable of capturing images are described later.

The computer system 102 can classify 112 each pixel of the image from the camera 104 as showing the backing 108 or not. For example, the computer system 112 can submit pixels of the image to a classifier that can classify the pixel. This classification may be in the form of a binary determination (e.g., empty value vs nonempty value) may be in the form of a confidence value (e.g., near 0 for likely empty vs near 1 for likely nonempty), or in another format.

The computer system 102 can find a shelf 114 location in the image. For example, the computer system 102 can examine the pixel classifications to find a long, generally horizontal shape of nonempty pixels and determine that this must be where the shelf 106 is captured in the image. As will be understood, the computer system 102 can identify different shapes if differently shaped shelves 106 are used. For example, a basket or bin may be used and the computer 102 can identify wider rectangular or trapezoidal shapes.

The computer system 102 can identify shapes of pixels classified as empty to determine where the shelf 106 may be empty. For example, if a large shape (e.g., more than a threshold number of pixels, minimum dimensions) directly above the shelf area is classified as empty, the computer system 102 can classify that area as empty. The computer system 102 can also identify areas of the shelf 106 as not empty. For example, a shelf 110 may be twelve inches below another shelf, and may have items that are nine inches tall. Such a situation would result in some pixels above the shelf classified as nonempty, then above those some pixels classified as empty. In such a case, the computer system 102 can identify that an item is on the shelf and that there is empty space above the item, resulting in a determination that the shelf 106 is not empty.

The computer system 102 can determine empty shelf locations and items that are missing from the empty locations. For example, the computer system 102 can use barcodes printed on the shelf 106, positioning information for the camera, or other data to determine which shelf 106 in a facility was captured by the image. With this location information, the computer system 102 can determine which item is expected to be on the shelf 106 or assigned to the shelf 106. Then, the computer system 102 can perform appropriate steps in response to determining that the item is not on the shelf 106. For example, the computer system 102 can generate instructions to restock the shelf, can generate a report about the empty shelf, can order more inventory to be delivered to the facility, etc.

Figure 2:
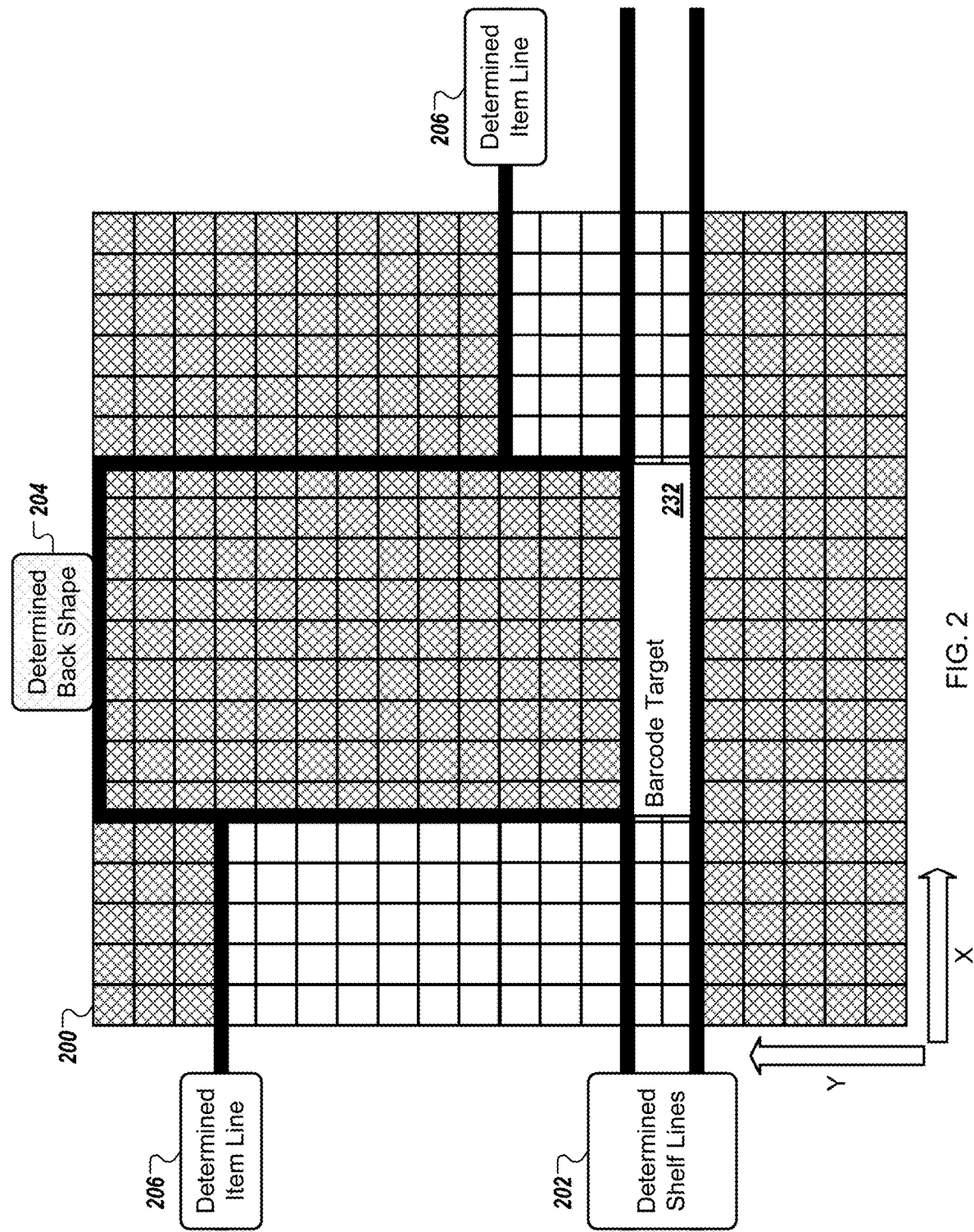
FIG. 2 shows example data used in analyzing images of shelves.

FIG. 2 shows example data used in analyzing images of shelves. A backing map 200 is rendered in FIG. 2 to show data that can be stored in computer memory (e.g., in computer system 102, memory 906) in, for example, binary format.

Images received from cameras can include pixels storing pixel values. For example, in a monochrome image, the pixel value can be a value from 0 to 1, from 0 to 256, etc. In a full color image, the pixel value can be in the form of a Red-Blue-Green (RGB) value. Each of these pixels can be uniquely addressed in the image with an [X][Y] address. Similarly, the backing map 200 can include a map of cell locations that is uniquely addressed in the backing map 200 with an [X][Y] address. As such, cells of the backing map 200 can have a one-to-one correspondence with pixel locations in an image.

The backing map 200 can be used to store classifications of pixels in an image by storing classification data in a cell with the same address as the pixel. For example, a pixel at location [10][17] may be classified as showing an empty or nonempty space, and an empty or nonempty value (e.g., 0 or 1) can be stored in the cell [10][17] of the backing map. In the example shown here, cells holding an empty value are shown shaded, and cells holding a nonempty value are shown in white.

With a completed backing map 200 for an image, a computer system can perform analysis on the image using the backing map 200 with or without the image. For example, the computer system can examine shapes of cells to identify objects shown in the corresponding image. In some cases, these shapes are contiguous areas of cells all having the same empty or nonempty value. In some cases, a threshold number or percent of the cells may have different values. This can allow the analysis to be performed even when normal amounts of nose are introduced into the image. For example, the image may capture an item on a shelf, and the item may be similar in color to the backing or may be in a shadowy area. In such cases, some of the cells corresponding to the item in the image may be misclassified as empty when infect they are not empty.

One or more shelf lines may be determined in the map 200. The shelf lines 202 can be found in locations having long, generally straight, generally horizontal shapes of cells with nonempty values if the shelves be imaged are similarly long, generally straight, and generally horizontal. The shelf lines 202 represent boundaries in the image where the edges of the shelves are located.

A back shape 204 can be identified in areas where a sufficient group of empty cells are found adjacent to, above, or near a shelf line 202. Shown here, a bounding box is drawn around the back shape. This bounding box may be stored in the map 200, in another data structure, or never explicitly calculated. As can be seen in the map 200, not all empty cells are classified as being part of a back shape. For example, in areas where nonempty cells are above a shelf line 202, analysis can determine that there is an item on the shelf, and then empty space above the item.

A barcode target 232 can be identified to find an identifier of the items that the shelf normally holds. The identifier can include, but is not limited to, one dimensional (1D) barcodes, two dimensional (2D) barcodes, SKUs, and other types of visual identifiers. A shape that is below the back shape 204 and between the shelf lines 202 can be identified as a barcode target area 232. This barcode target area 232 can identify an area in the image to be read to find a barcode value to identify which items are to be stocked or stored in the empty area. As will be understood, identification in the map 202 can produce a group of cell addresses, and the pixels having the same addresses in the image can be examined for the barcode. As such, using a map and image with the same unique addresses for corresponding cell and pixel locations can allow for more simple and efficient analysis than other systems in which different address schemes are used.

Other features of the image can be identified by analysis of the map 200. For example, an item lines 206 can be identified at the upper border of shapes of nonempty cells. The location of these item lines 206 relative to a shelf line 202 can provide an indication of how many items are stacked on the shelf. For example, the map 200 may be generated in a case where a shelf has one box, then no boxes, then three boxes. As such, this height may be used for inventory management to, for example, order restocking of a shelf that is not empty but is below a threshold number of items. This can advantageously provide for stocking 'just in time' or ahead of actual need, providing for continuously available items or continuously nonempty shelves.

Figure 3:
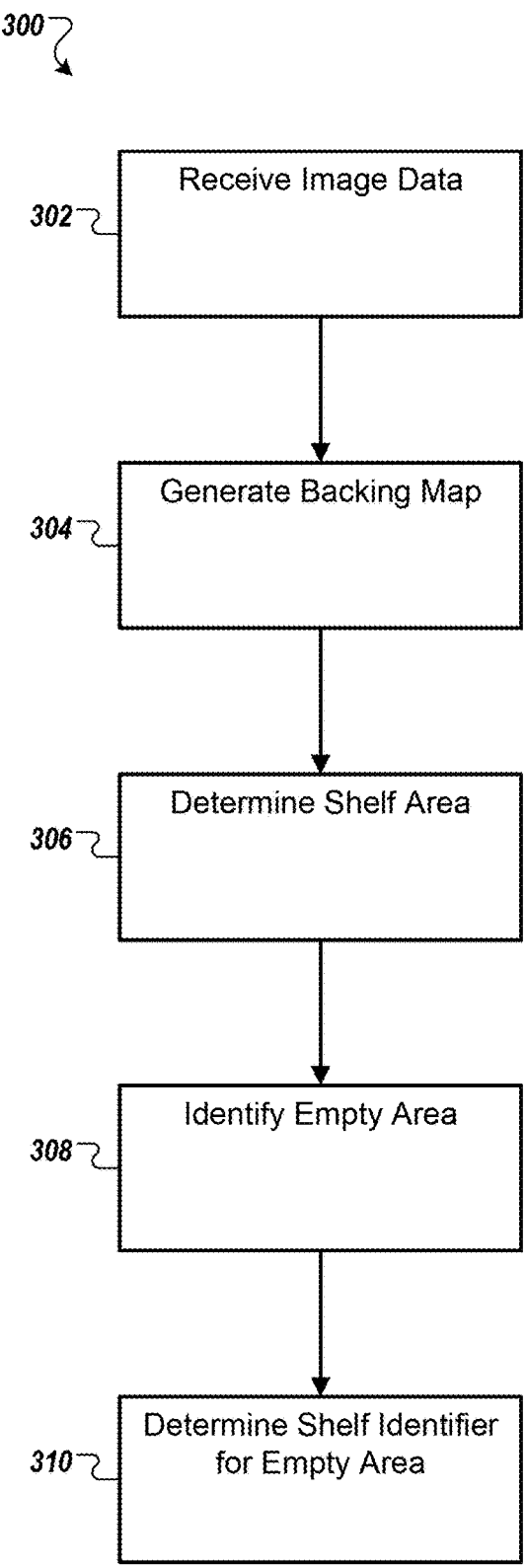
FIG. 3 shows an example process for analyzing images of shelves.

FIG. 3 shows an example process 300 for analyzing images of shelves. For example, the process 300 can be used to examine images of shelves to determine if the shelves are empty, and if they are empty, identify items that should be on the shelf. In the process 300, a backing map such as the backing map 200 is being used. However, other processes may use different data.

Image data is received 302. For example, a camera is equipped with a sensor that captures light, a distance sensor is equipped with a sensor that measures distance to a solid object, etc. This sensing data can be compiled into image data with pixel locations, and the image data can be transmitted to a computer or controller for analysis.

A backing map is generated 304. For example, the backing map 200 can be generated with the same number and arrangement (e.g., row count and column count) of cells as the image data has pixel locations. Analysis of the image can be performed and data that results from the analysis can be stored in the cells.

For example, pixel values (e.g., color or intensity value) that correspond to a cell's location can be accessed, and the pixel value can be supplied to a classifier that classifies the pixel as shown either shelf backing (e.g., shelf backing 108) or an item in front of the backing. Then, an empty or nonempty value can be stored in the cell of the map 200 with the same address as the pixel location.

The classifier may in some cases be a machine-learning classifier that uses a model generated by training a model on a corpus of test images that have been tagged with empty or nonempty tags. The classifier may in some cases be a non-machine-learning classifier that uses a set of rules and heuristics to classify pixels of the image.

In some cases, the classifier may other data as input in addition to the pixel value. For example, the entire image data can be supplied to the classifier along with an address of a pixel location to be classified. In such cases, the classifier may use a model that considers at least i) the pixel value of the corresponding pixel location, and ii) other pixel values in the image data other than the pixel value of the corresponding pixel location based on the unique address. For example, the model may use image recognition on surrounding image areas to determine context for the pixel at issue—e.g., a dark pixel surrounded by light-colored items may be classified as more likely to be empty. As will be appreciated, the particular decision criteria of many machine-learning models are not completely understood or documented.

In some cases, a location at which the image is captured may be provided, along with item location data that specifies shelves in the facility and objects to be stored on the shelves in the facility. In such cases, the classifier may use a model that considers at least i) the pixel value of the corresponding pixel location, and ii) objects to be stored near the facility location that defines where in a facility the image data was captured. For example, the model may use the location information to determine the colors of items scheduled to be placed on shelves near the area of the image and refine the classification based on the colors in the image. For example, a mid-tone pixel value in an area with brightly colored items may be more likely to be classified than a similar mid-tone pixel value in an area with darkly colored items. As will be appreciated, the particular decision criteria of many machine-learning models are not completely understood or documented.

After submitting the input data to the classifier, the classifier can supply a backing value as output, and the backing value may be recorded in a cell in the data 200 with the same address as the pixel being classified.

Shelf areas are identified 306. For example, the backing map 200 can be examined to identify shapes of nonempty cells that match shapes of the shelves. In cases where the shelves are thin and flat, thin flat rectangles may be identified as shelf areas. In cases where the shelves include bags or baskets, shapes such as trapezoids and semicircles may be identified as shelf areas.

Empty areas are identified 308. For example, the backing map 200 can be examined to find areas of empty values that meet one or more rules. The rules may in some cases be generated with machine-learning by training a model on a corpus of test maps that have been tagged with empty or nonempty areas tags. The rules may in some cases be generated with a non-machine-learning set of rules and heuristics to classify pixels of the image. For example, the rules may identify as an empty area groups of pixels directly above a shelf area.

A shelf identifier for the empty area is determined. For example, the image data and/or other data may be used to determine the shelf that is empty, the items to be placed on the shelf, etc. In some cases, this can include identifying a barcode target area within or relative to (e.g., above, below, within a threshold distance) the shelf area, and scanning the image data in the barcode target area to read a barcode captured by the image data.

Figure 4:
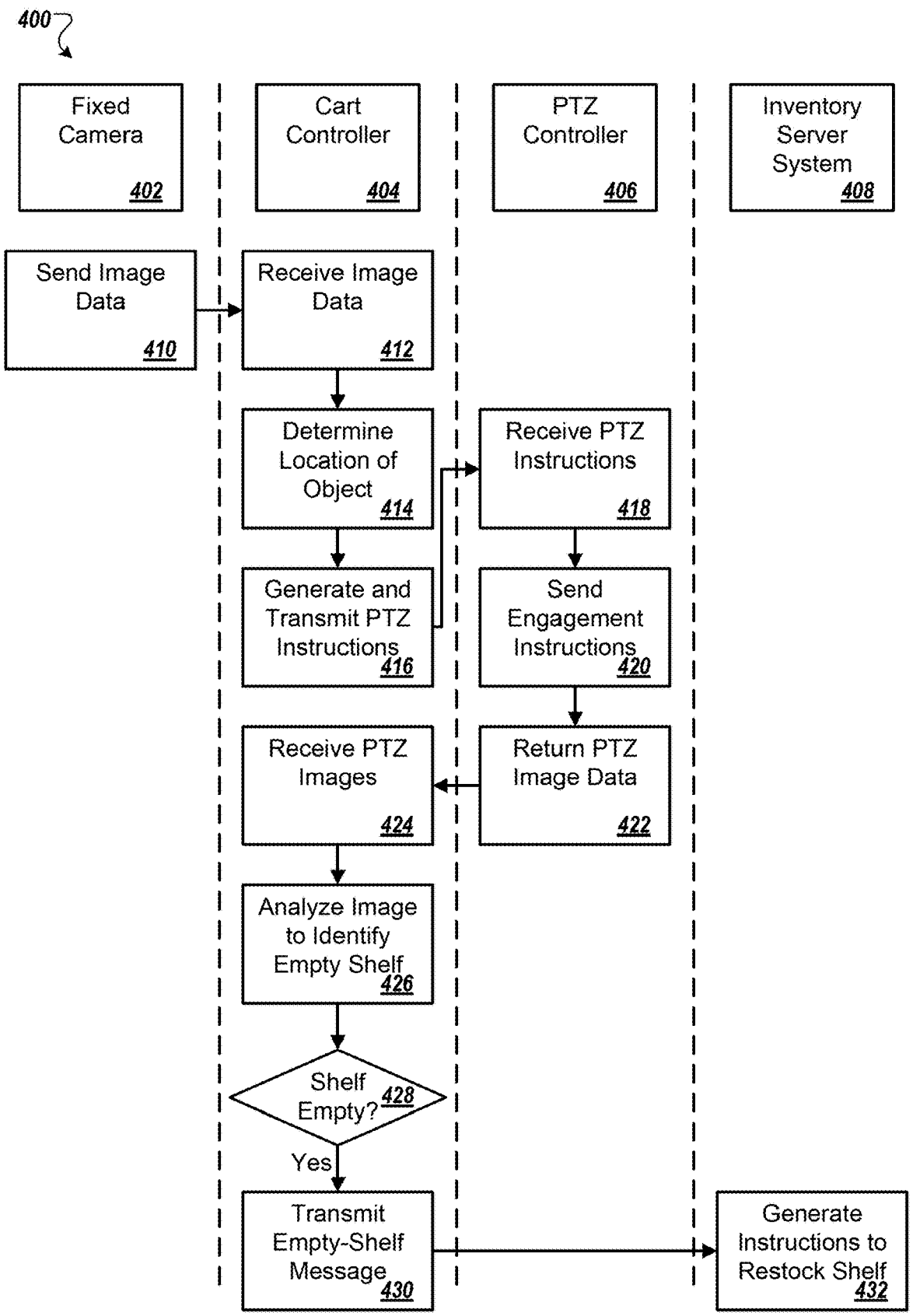
FIG. 4 shows an example process of operating a cart with features to analyze images of shelves.

FIG. 4 shows an example process 400 of operating a cart with features to analyze images of shelves. In the process 400, a cart is equipped with a fixed camera 402, a cart controller 404, and a pan-tilt-zoom (PTZ) controller 406 that controls a PTZ camera. The cart is in data communication with an inventory server system 408. Further details of these elements can be found later in this document. However, other devices and systems can be used to perform the process 400 and other processes. Moreover, although the process 400 is described in reference to a PTZ camera, the process 400 works with any other type of camera, such as a high resolution camera.

A fixed camera 402 sends 410 image data to the cart controller 404. The cart controller 404 identifies an inventory item of interest in the data from the camera 402 to collect higher-detail data with the PTZ camera. For example, the fixed camera may be operated continuously while the cart controller 404 is engaged and the cart controller 404 can monitor the data from the fixed camera 402 to identify areas that may have an empty area 308. When such an area is found, the cart controller can identify that as an area of interest to be more closely examined with a higher resolution, higher power PTZ camera.

To do so, the cart controller 404 can look up 414 an offset value that defines a difference in location between the fixed camera 402 and the PTZ camera. For example, the cart controller 404 may maintain in memory a list of offsets and their associated fixed camera identifier, if there are more than one. The cart controller 404 can use this offset to modify the location in the view space of the fixed camera 402 by, for example, multiplying the location in 3D space by a matrix that defines a translation and transformation.

The cart controller 404 can then generate 418 PTZ instructions using the modified location in order to instruct the PTZ camera to pan, tilt, and zoom to capture the location of the object of interest. The PTZ controller 406 is configured to receive 418 PTZ instructions from the cart controller 404. For example, the cart controller 404 can send, over a network of the cart, the PTZ instructions to the PTZ controller 406.

The PTZ controller 408 is configured to, responsive to receiving the PTZ instructions, send 420 the engagement instructions to the PTZ camera. For example, the PTZ controller 406 can drive the zoom motor in accordance with zoom commands received, can drive the pan moto in accordance with the pan instructions received, and can drive the tilt motor in accordance with the tilt commands received.

In some cases, the PTZ controller 406 can also wake the PTZ camera up from an energy saving state. For example, the camera PTZ camera be configured to operate in a plurality of modes, the plurality of modes comprising at least i) a sleep mode and ii) a working mode, wherein the working mode consumes more power than the sleep mode. As such, the PTZ camera can be kept in the sleep mode to conserve battery life of the cart when not needed, and only selectively be awoken into the working mode when needed. In such cases, the PTZ controller 406 is configured to transition, in response to receiving the PTZ instructions, the PTZ camera from the sleep mode to the working mode and to later transition the PTZ camera from the working mode to the sleep mode after the PTZ image data is transmitted from the PTZ controller to the cart controller.

The PTZ controller 406 is configured to return 422 the PTZ image data and the cart controller 404 is configured to receive 424 PTZ image data. For example, the PTZ controller 406 can send, over the cart's network, images captured by the PTZ camera. These images may be higher resolution, use a larger color space, and/or be captured at a greater frequency than the images from the fixed camera 402.

The cart controller 404 can analyze the image data to identify 426 empty shelf areas. One example process 300 for doing so is described previously. If an empty shelf area is found 428, the cart controller 404 can transmit to the inventory server system 408, through a network interface, an empty-shelf message includes the shelf-identifier 430. For example, the message may include a barcode value or similar that is associate with the empty shelf location. When information is transmitted to the inventory server system 408, a bundle of information can be transmitted. The bundle of information can include location information and one or more image data of the empty shelf location. The bundle of information can also include an inference of whether the shelf location is empty (e.g., an out of stock condition). This bundle of information can be used by the inventory server system 408 to validate the determination made by the cart controller 404 that the shelf location is empty. Accordingly, the inventory server system 408 can perform additional processing and analysis of the image data to verify that the shelf location is in fact empty.

The inventory server system 408 can generate, using the shelf-identifier, instructions 432 to restock the shelf that is empty of items. For example, the inventory server system 408 can generate instructions to be rendered on a human user's computing device with a request to pick an item from a back room and to place the item in the empty shelf location. The instructions can include or be computer-readable instructions for one or more automated item-handling devices. For example, the empty shelf may be in a warehouse with automated package handling equipment, and the instructions may instruct a conveyor belt, etc., to move an item to the empty shelf space.

Although FIG. 4 is described in reference to a PTZ camera, the process 400 can also be performed using one or more different types of cameras, such as cameras that are capable of panning only, zooming only, tilting on, adjusting aperture only, adjusting shutter speed only, or any combination thereof.

Figure 5:
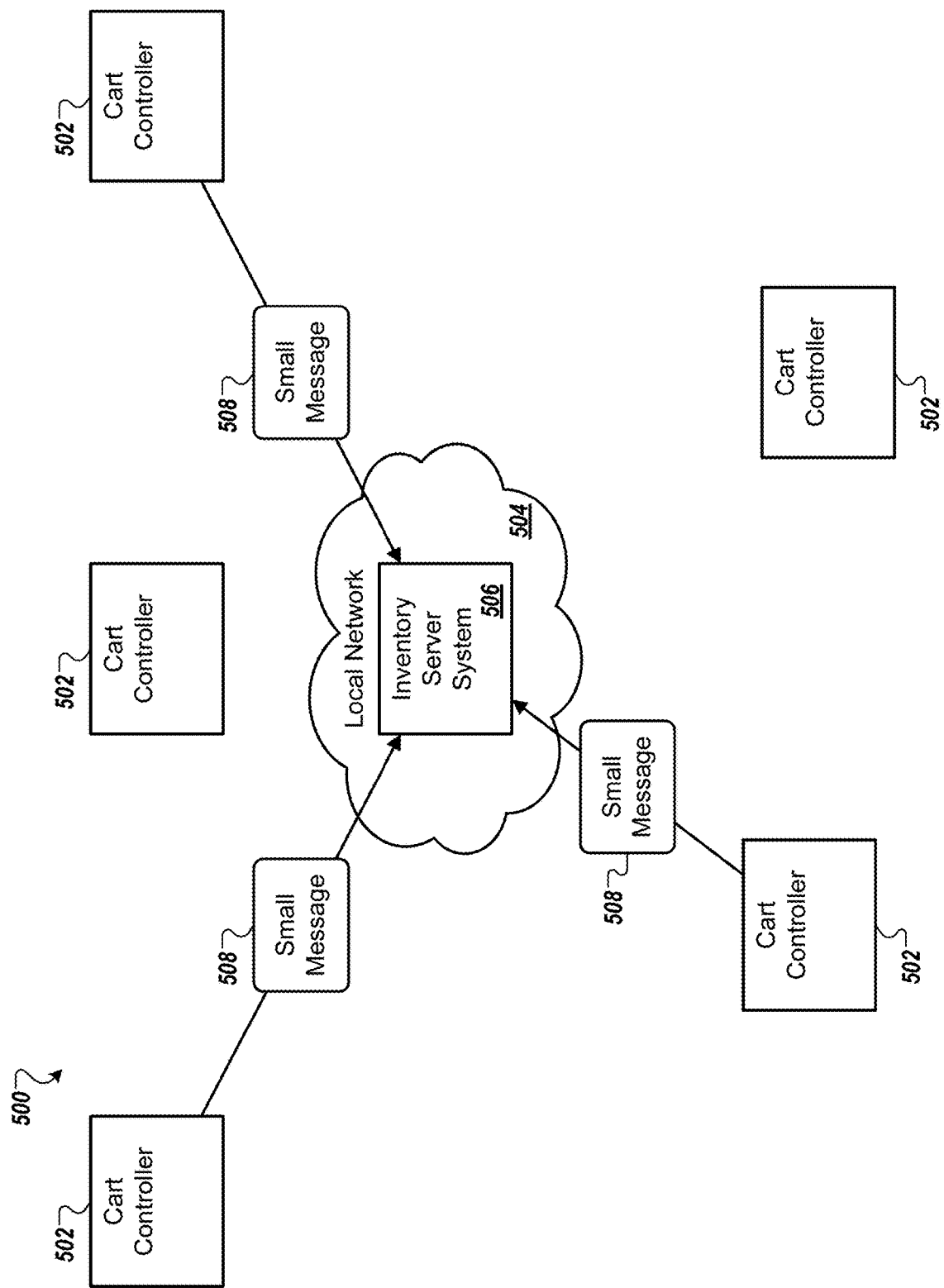
FIG. 5 shows an example system of computing devices in a retail location.

FIG. 5 shows an example system 500 of computing devices in a retail location. The system 500 may be used, for example, by a store or distribution center that has carts moving around shelves on which items are stored. This can include, for example, shopping carts and floor scrubbers moving around a retail store with products on shelves that are picked up by customers and taken to a cash register for purchase. In another example, a distribution center can have pallet jacks and carts that are used to stock shelves and fulfill orders for the items on the shelves. In any case, it will be appreciated that items can be placed and picked up off the shelves, and the system 500 can be used to allow for automatic collection of data about the status of those shelves or other storage areas (e.g., bins, cartons, bags, pallets).

Cart controllers 502 and other data-processing hardware on the carts can be used to perform image analysis on the shelves and items in order to identify shelves that are empty. As will be appreciated, these cart controllers 502 may be configured to operate using mobile power sources (e.g., batteries, renewable sources) and may not be tethered to stationary power sources such as electrical mains. Further, a local network 504 connects the cart controllers 502, an inventory server system 506, and other devices (e.g., computers and phones). Like all networks, the network 504 has limited bandwidth and capacity. As such, the system 500 can be advantageously configured so that the cart controllers 502 transmit only small messages 508. The small messages 508 may be configured to include only alpha-numeric data and not larger data like images collected by cameras on the carts. For example, the cart controllers 502 can perform image analysis process (e.g., process 300 and 400) on the network edge, transmitting only the results in the small messages 508 and not the full images or maps. Compared to the full images or maps, the small messages may specify, for example, a shelf found to be empty and a timestamp. This may allow for the use of small messages 508 that are orders of magnitude smaller than the images that were analyzed to produce the small messages 508. As will be understood, a system with many components transmitting small messages instead of large messages is a useful advantage to the computing technology. Similarly, cart controllers 502 using small classifier models for image classification tasks can contribute to these advantages by requiring less power from the mobile power sources, which, like all mobile power sources, are limited in the amount of power they can provide before running out, needing recharging, etc. Systems and process for generating such small models will be described later.

Figure 6:
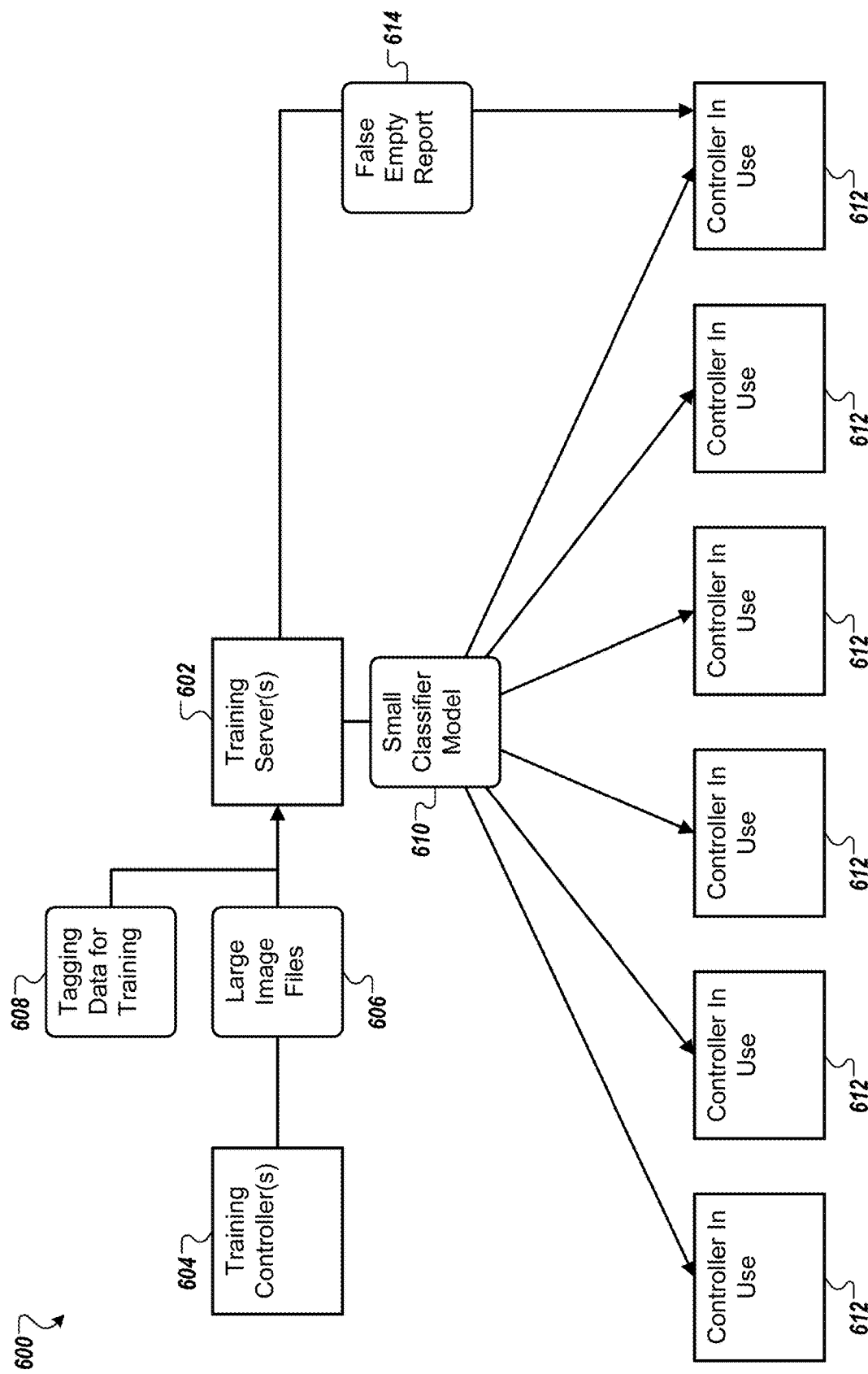
FIG. 6 shows an example system that generates classifier models for image analysis.

FIG. 6 shows an example system 600 that generates classifier models for image analysis. For example, the process 600 can be used to generate classifier models for use in the processes and system described in this document to classify pixels as showing an empty or nonempty shelf space, to identify shapes on a backing map, and for other purposes.

One or more training servers 602 can perform machine learning processes on training data to create models that classify later-received data in a way that the training data classifies training data. For example, a training controllers 604 can be used to collect large image files 606 of shelves that empty as well as shelves that are nonempty is real or simulated environments (e.g., real retail stores or areas in an engineering lab with shelves and products placed as they would be in real retail stores). The training controllers 604 may be incorporated into carts as described in this document, or may be used in other (e.g., lower cost) rigs. Training data for the large image files 606 can also be provided to the training servers 602. The tagging data 608 can tag each large in file 606, or subsections of the images, as having an empty shelf or a nonempty shelf. In some cases, the tagging data 608 can be generated by human users reviewing each image and recording data in a computer to tag the image. In some cases, the tagging data may be generated in whole or in part based on existing corpuses of images that have already been tagged by a different process, for another purpose, etc.

The training server 602 can generate a small classifier model 610 for distribution to controllers in use 612. For example, the training server 602 can communicate the small classifier model to cart controllers already in retail environments to update old classifier models. In some cases, the small classifier model 610 can be incorporated onto a disk image used to manufacture new cart controllers and/or new carts. The training server 602 may transfer packets of data instead of entire streams of data (e.g., image files). The training controller 604 can operate like a filtering mechanism to filter out what data is transmitted between components, such as what information is distributed to the controllers in use 612. Transferring packets of data can be beneficial because it leads to more efficient data transmission and a reduction or avoidance in clogging network bandwidth. The controllers can then process the data in the packets both faster and more efficiently when utilizing local hardware and computational resources.

The controllers in use 612 can use the small classifier model 610 while performing image analysis tasks, such as those described in the processes 300 and 400. In some cases, the use of this technology can lead to incorrect results. For example, a cart controller 502 may report to the inventory server system 506 a message 508 that a particular item is out of stock on a shelf. However, when a worker is dispatched to restock that item, they may discover that the item is already on the shelf Such false-empty events can be logged in a false-empty report 614 and communicated to the training server 602.

The training server 602 can use one or more false-empty reports to retrain the model and produce a new small classifier model 610 that is more accurate and can account for the conditions that created the false-empty report. This updated model 610 may then be distributed to the controllers in use 612 and the controllers in use can begin using the updated model 610 instead of the older model 610. This can provide for classifier models that advantageously improve over previous versions, allowing for more accurate image processing and allowing for updated models in changing conditions.

As shown, the small classifier model is distributed to controllers 612 for use in image analysis processes. In some configurations, the small classifier model can be recorded in computer memory or transmitted over data networks using binary data of a size on the order of 500 kilobytes (kB), less than 1 megabyte (MB), etc. One advantage of using models of this small size is that distributing the model to many destinations uses fewer network resources than other technology that must transmit much larger model. This advantage is compounded when the small classifier model 610 is transmitted to many destinations as would be the case for a retail enterprise with hundreds or thousands of facilities, each with dozens or hundreds of cart controllers.

Another advantage to the use of small classifier models 610 is that they may be used by cart controllers that have limited processing power and energy availability. This can allow image processing to be performed at network edge locations (cart controllers) instead of in central computing resources like an inventory management server. Performing the image processing at the edge allows for capacity to expand the system, as each cart controller added to the system brings along the computational resources required to facilitate the additional image processing required for the cart controller. A small model also allows for processing to be performed on hardware of limited computational power. Such controllers provide a number of advantages including lower cost than more powerful hardware, and lower power consumption. As explained in this document, the controllers can be powered by a mobile power sources such as a battery which can have a limited capacity. By using lower models, and thus less battery power, cart controllers using this technology can perform more image recognition tasks between charging sessions.

Figure 7:
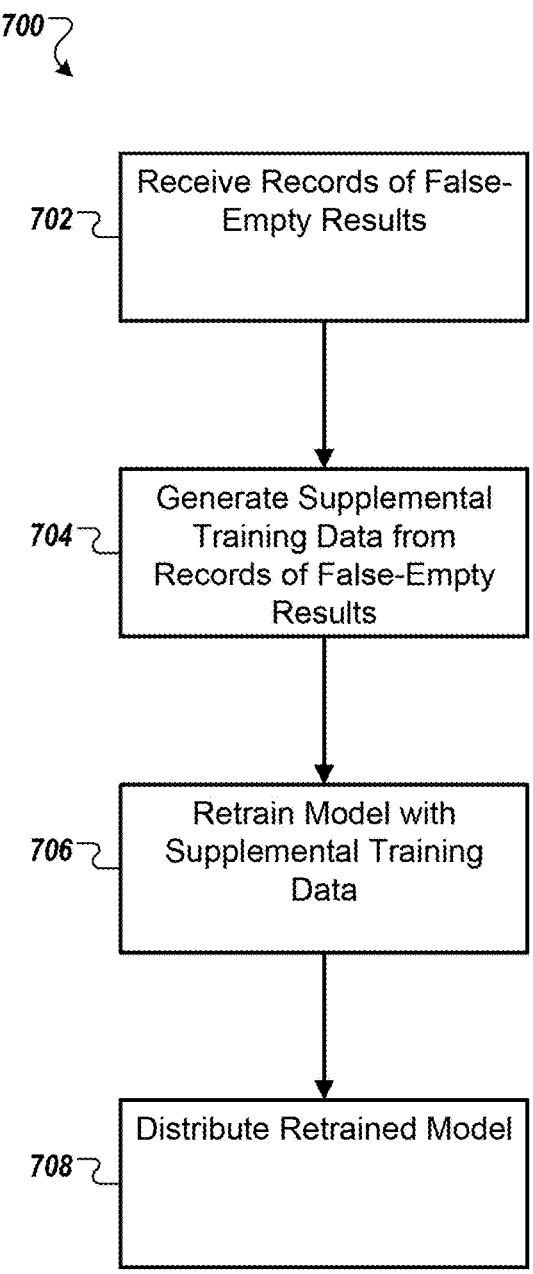
FIG. 7 shows an example process for training classifier models.

FIG. 7 shows an example process 700 for training classifier models. For example, the process 700 can be performed by the system 600 and thus system 600 will be used in describing the process 700. However, another system or systems can be used to perform the process 700 or similar processes.

Records of false-empty results are received 702. For example, the controllers 612 can report an item as not on a shelf, and an inventory server system can determine that the item was in fact on the shelf when the cart controller analyzed that shelf. In such cases, the inventory server system can generate a false-empty record that includes a copy of the image that was analyzed, requested from the cart controller 612 after the false-empty result was identified, and other data such as timestamp, facility location, etc.

Supplemental training data is generated from the records of false-empty results 704. For example, using human tagging data and/or data from the false-empty result, the training server 602 can generate supplemental training data that is in the same format as the large image files 606 and tagged data from training 608 previously used to train the small classifier model.

Classifier models are retrained using the supplemental training data 706. For example, the training server can use all of the supplemental training data along with some, all, or none of the original training data 606 and 608 that was used to train the classifier that was used in generating the false-empty results. In some cases, use of all or some of the original training data along with the supplemental training data can improve the retraining process, and in some cases, using exclusively the supplemental training data may instead improve the retraining process.

Retrained classifier models are distributed 708. For example, the training server 602 can transmit the new small classifier model 610 to the controllers 612 over data networks, and new controllers being created can be programmed initially with the update small classifier model.

Figure 8:
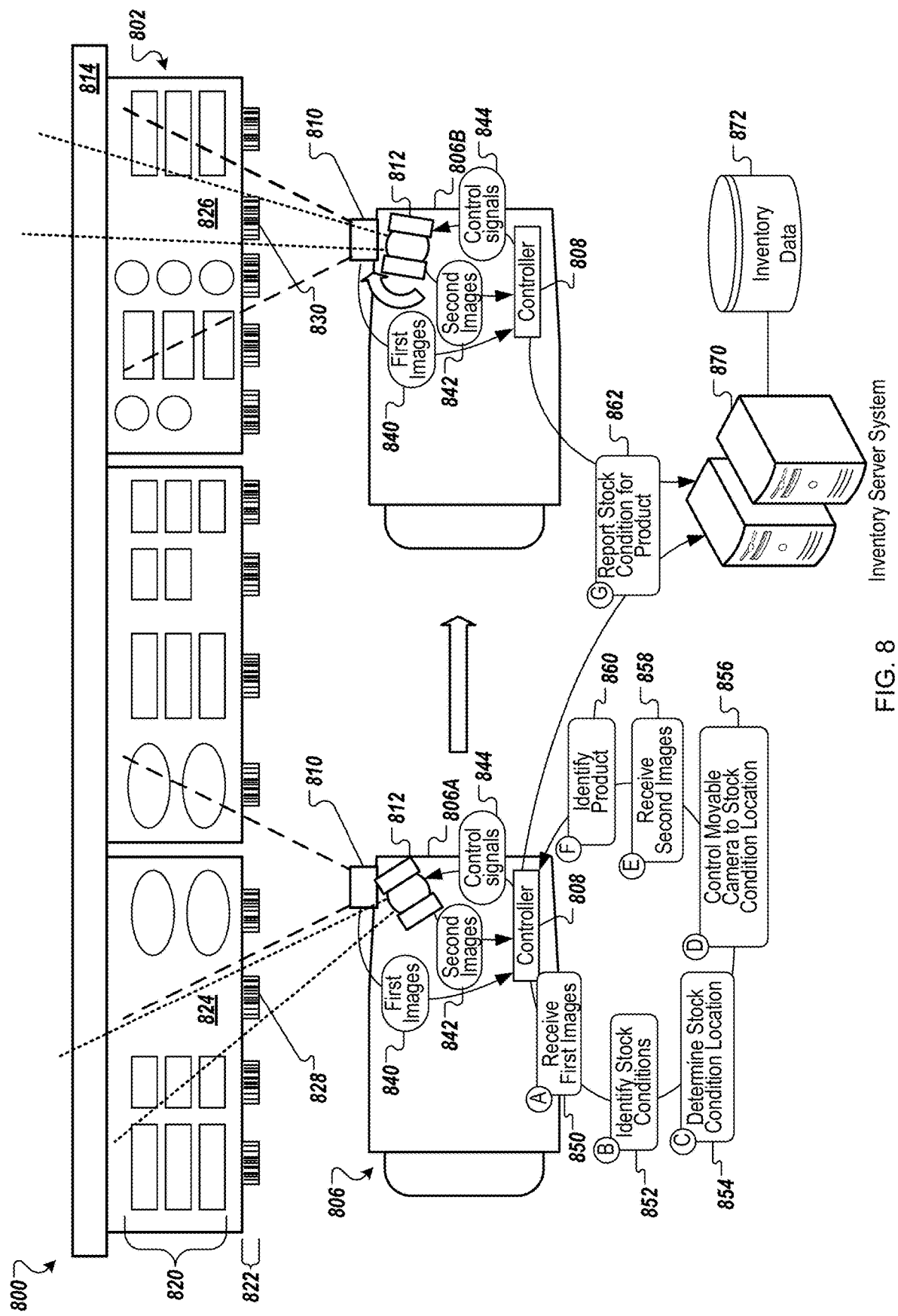
FIG. 8 shows an example system using computer vision to identify stock levels of items on shelves.

FIG. 8 shows an example system 800 using computer vision to identify stock levels of items 820 on shelves 802. In the system 800, a cart 806 (example of a movable device that apparatus can be a part of or otherwise attached to) is traveling through an aisle or other area of an environment (e.g., retail store) with shelves 802. A fixed camera 810 on the cart 806 can generate low-resolution images of the shelves 802. A movable high-resolution camera 812, such as a Pan Tilt Zoom (PTZ) camera, can also be included on the cart 806 to generate high-resolution images of specific locations on the shelves 802.

The shelves 802 can store inventory 822 for sale, storage, staging, etc. The shelves 802 can include a backer surface 814 that forms a vertical wall defining a back of each of the shelves 802. When items 820 are on the shelves 802, the items 820 can occlude view of portions of the backs 814, and when items 820 are absent from the shelves 802, such as at location 824 and location 826 on the shelves 802, more of the backs 814 can be viewed from the perspective of the cart 806. The shelves 802 can additionally include labels 822 that identify the items 820 and that are positioned adjacent to the items 820 on the shelves 802 (e.g., affixed to front surface of shelf). The labels 822 can include, for example, a product description (e.g., product name, manufacturer name, model number), a product price, and one or more unique identifiers for the product, such as a barcode or QR code that provides a UPC code for the product.

The cart 806, shown as 806A earlier and 806B later as the cart moves forward, travels past shelves 802. The cart 806 can be any sort of cart or other device that can be moved through a retail or inventory environment. Examples include, but are not limited to, shopping carts, pallet jacks, floor cleaners, lifts, autonomous inventory-moving robots, etc. In many cases, the cart 806 can include wheels, a handle or other fixture for moving the cart, and hardware (e.g., baskets, motors, scrub brushes, bags, forklift tines) for purposes other than facilitating imaging of the environment (e.g., transporting inventory, cleaning floors).

The fixed camera 810 can be non-movably affixed to the cart 806 to capture images of the environment around the cart 806. This non-movable affixing can include, for example, the camera 810 being encases in integral housings of the cart, being fastened with fasteners (e.g., screws, nuts-and-bolts). The fixed camera 810 can be mounted on the cart 806 at any of a variety of different orientations, such as angled to the side, forward, backward, and/or other orientations. For example, the camera 810 may be mounted orthogonal (i.e. at a right angle to) the direction of travel to the cart. As will be understood, other angles are possible, including angles greater than orthogonal.

The movable camera 812 (e.g., PTZ camera, a high resolution camera) is mounted to the cart 806 in a cradle with controllable mechanisms (e.g., motors) capable panning and tilting the camera, and the movable camera 812 can further be equipped with controllable structures to optically zoom (e.g., lenses and/or mirrors). As shown, the movable camera 812 can be mounted in a position in the cart 806 such that the movable camera 812 has a point of view into the viewspace of the fixed camera 810 mounted on the cart 806. For example, the movable camera 812 can be mounted adjacent or near the fixed camera 810, such as on the same side of the cart 806 as the fixed camera 810 and within a threshold distance of the fixed camera 810 (e.g., within threshold horizontal distance, within threshold vertical distance, within overall threshold distance). In some cases, the movable camera 812 may be mounted in a common vertical plane or a common horizontal plane as the fixed camera 810.

A controller 808 can also be provided that is communicatively coupled (e.g., wired connection, wireless connection) to both the fixed camera 810 and the movable camera 812. For example, the controller 808 can receive first images 840 from the fixed camera 810 and second images 842 from the movable camera 812. The first images 840 can be low resolution images that provide a broader view of the shelf 802 and the inventory items 820, as indicated by the wider angle defined by the dashed lines emanating from the fixed camera 810. The second images 842 can be high resolution images of more specific areas of the shelf 802 (as indicated by the smaller angle defined by the dotted lines emanating from the movable camera 812) that are achieved by adjusting the movable camera 812 according to control signals 844 provided from the controller 808 to the movable camera 812. For example, the controller 808 can transmit control signals 844 that include, for example, signals to adjust pan, tilt, and zoom for the movable camera 812.

The controller 808 can identify specific items from the shelves 802 that have inventory conditions, such as being out of stock, having low inventory, having at least a threshold level of inventory, and/or other conditions. To accomplish this, the controller 808 can receive the first images 840 from the fixed camera 810, as indicated by step A (850). The controller 808 can analyze the first images 840 to identify stock conditions in the shelf 802, as indicated by step B (852). Such analysis can include, for example, identifying portions of the shelf 802 where at least a threshold area of the back 814 of the shelf 802 is identifiable in the first image from the vantage point of the fixed camera 810, which can indicate an out of stock condition. For instance, in the depicted example, the controller 808 can detect location 824 (for the cart at time 806A) and detect location 826 (for the cart at time 806B) from first images 840 including at least a threshold area depicting the back 814 of the shelf 802—indicating an out of stock condition at locations 824 and 826. Other analysis and conditions may additionally and/or alternatively be detected.

Once an out of stock condition is detected, the controller 808 can determine a physical location on the shelf 802 for the stock condition relative to the position of the cart 806 and the cameras 810/812, as indicated by step C (854). For example, the controller 808 can correlate coordinates from the first image 840 (e.g., x, y coordinates) where the stock condition is detected to a physical location relative to the position of the cart 806. Using the physical location for the stock condition, the controller 808 can generate and transmit the control signals 844 to the movable camera 812, as indicated by step D (856). The control signals 844 can be generated to move and/or otherwise adjust the movable camera 812 so that it is focused in on the area where the stock condition was detected, such as through adjusting one or more motors or other components in the movable camera 812. For example, the control signals 844 can cause the movable camera 812 to move and adjust so it is oriented on the area around the locations 824 and 826.

The controller 808 can then receive second images 842 from the movable camera 812 from the area around the target locations (e.g., locations 824 and 826), as indicated by step E (858), and analyze those second images 842 to identify a product that corresponds to the stock condition, as indicated by step F (860). Identifying the product corresponding to the stock conditions can include the controller 808 analyzing the second images 842 to detect, for example, identifying information (e.g., barcode, UPC number, product name) from product labels 822 that correspond to locations where the stock conditions are detected. For example, the controller 808 can identify the label 828 that corresponds to the location 824 and the label 830 that corresponds to the location 826, and analyze portions of the second images 842 depicting those labels 828 and 830 (e.g., image-based barcode recognition, optical character recognition, object detection techniques) to identify the corresponding product. The identifying information can include, for example, a UPC code or other unique identifier for the product.

The controller 808 can include a network interface that is capable of transmitting detected stock conditions along with product identifiers to an inventory server system 870, which can maintain a database 872 of current inventory levels, as indicated by step G (862). The inventory server system 870 be local and/or remote from the environment (e.g., retail store) where the cart 806 and the shelves 802 are located. For example, the inventory server system 870 and its inventory data 872 may be part of a broader system that is used within an individual retail store by workers to determine when to restock various items 820 on the shelves 802, and/or may be used by remote customers (e.g., mobile device user, desktop user) looking up current availability of items 820 on the shelves 802 through a mobile app or web interface. As a result, the use of the cart 806 to passively and automatically identify inventory conditions for the items 820 on the shelves 802 can provide more accurate and up-to-date inventory information for both internal users and external users. Furthermore, by adding the controller 808 and cameras 810/812 to a fleet of carts 806 and/or other movable devices/apparatus in an environment (e.g., retail store), most if not all of the environment may be traversed within a period of time (e.g., half hour, one hour, 4 hours, 8 hours) across the fleet of carts 806 and/or other devices/apparatus to provide comprehensive and updated stock condition information for the environment.

The cameras 810/812 and the controller 808 may be part of the cart 806 and/or may be attachable to the cart 806. In some instances, the cameras 810/812 and the controller 808 can be contained within a common housing that can be mounted to the cart 806. Other configurations are also possible.

Figure 9:
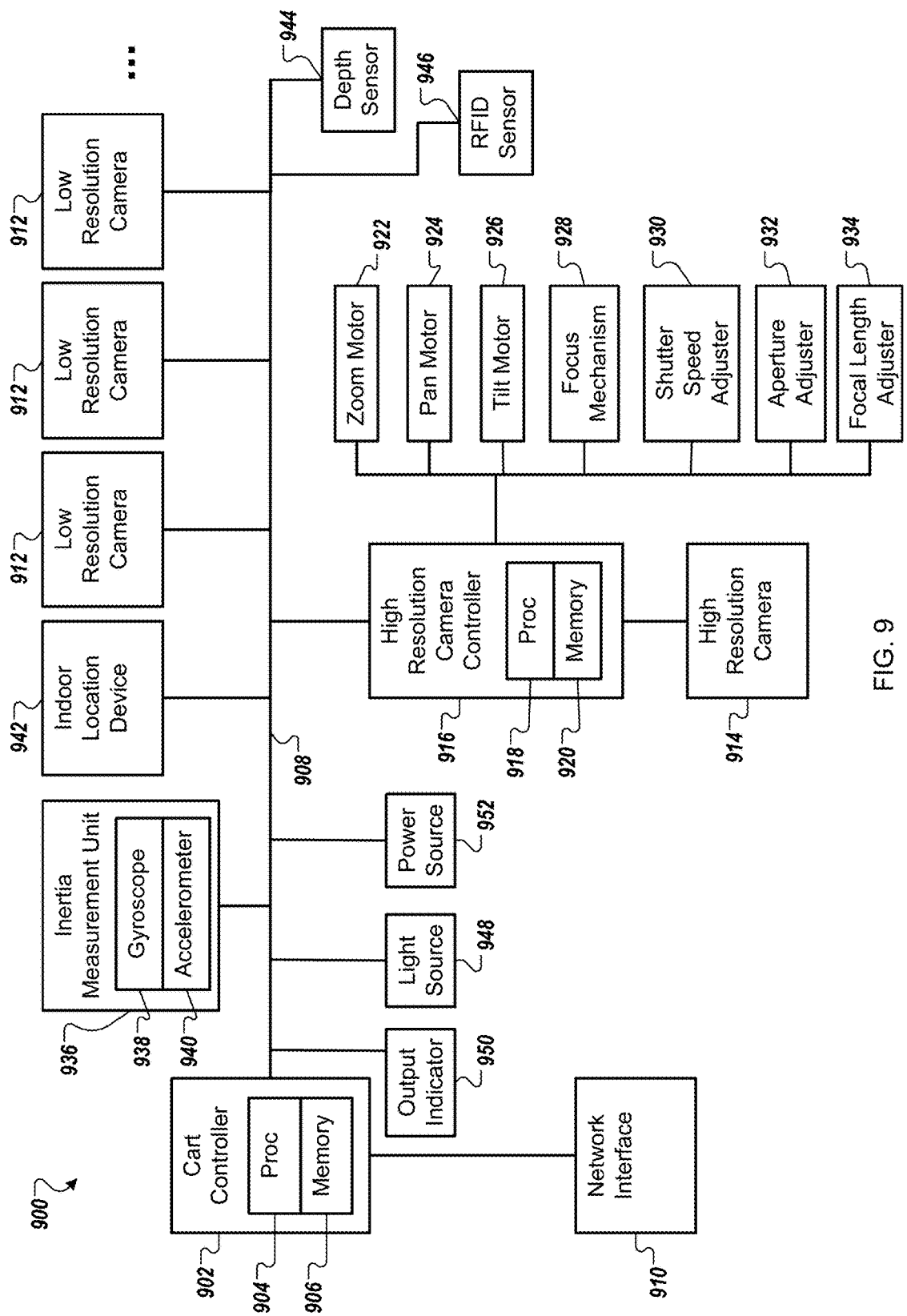
FIG. 9 shows an example of computing hardware of a cart for the collection and communication of stock levels of items on shelves.

FIG. 9 shows an example of computing hardware 900 of a cart for the collection and communication of stock levels of items on shelves. For example, the hardware 900 may be integrated into a cart 806 or other device.

The system 900 can include a cart controller 902 with one or more processors 904 and memory 906. The cart controller can be integrated into the body of the cart, including by having an integrated housing made of a rigid material (e.g., plastic, metal). A data network of the cart 908 can pass through the housing, for example with wires passing through one or more ports, and/or with wireless data signals passing through the rigid material.

The data network 908 can include one or more wired and wireless data links that connect components of the system 900 to allow data communication, electrical power transmission, etc. Data network 908 can sometimes be referred to as a control area network (CAN) or a data bus. A network interface 910 can interface with one or more external data networks and allow elements of the system 900 to communicate with elements of other data processing systems including, but not limited to, remote servers, local computing devices such as smartphones, etc. The network interface can include some, all, or none of the following types of network interfaces: BLUETOOTH, WiFi, Zigbee, and Ethernet. The data network 908 can collect components including but not limited to low resolution cameras 912, a high resolution camera 914, a high resolution camera controller 916, zoom motor 922, pan motor 924, tilt motor 926, focus mechanism 928, shutter speed adjuster 930, aperture adjuster 932, focal length adjuster 934, inertia measurement unit 936, indoor location device 942, depth sensor 944, RFID sensor 946, light source 948, output indicator 950, and/or power source 952. The components 922, 924, 926, 928, 930, 932, 934, 936, 942, 944, 946, 948, 950, and 952 can be optional. In some implementations, fewer than all of the components 922, 924, 926, 928, 930, 932, 934, 936, 942, 944, 946, 948, 950, and 952 may be included.

Low resolution cameras 912 and a high resolution camera 914 can collect image data from the surrounding environment and transmit that image data to the controller 902. The low resolution cameras 912 can include hardware, firmware, and software capable of capturing images that produce less data (e.g., lower resolutions, at a lower framerate, and/or with fewer color) than the high resolution camera. For example, the low resolution cameras 912 may capture images every 0.5 seconds in monochrome at a resolution of 1224×600, while the high resolution camera 914 can capture images at 60 Hz in 16 bit at 3840×1600. As will be understood, the cameras 912 and/or 914 may be selectively engaged or disengaged. For example, the controller 902 may collect image data from the low resolution cameras 912 at all times, and may turn on or awaken the high resolution camera 914 only selectively. For example, the high resolution camera 914 may be engaged periodically, in response to the controller 902 identifying an item of interest in data from the low resolution cameras 912, etc. In such a way, the system 900 can gain the benefits of the use of the high resolution camera 914, without requiring he electricity to operate the high resolution camera 914 at all times.

The high resolution camera controller 916, which can include one or more processors 918 and memory 920) can control one or more operations of the high resolution camera 914. While not shown here for example, the controller 916 can receive instructions from the cart controller 902 to adjust pan, tilt, and zoom of the high resolution camera 914. In response, the controller 916 can engage one or more motors accordingly. The zoom motor 922 can engage to zoom the high resolution camera 914 in and out. The pan motor 924 can engage to pan the high resolution camera 914. The tilt motor 926 can engage to tilt the high resolution camera. As other examples, the focus mechanism 928 can be mechanical and/or digital. The focus mechanism 928 can be engaged by the controller 916 to adjust a focus of the high resolution camera 914.

The shutter speed adjuster 930 can be mechanical and/or digital. The shutter speed adjuster 930 can be engaged by the controller 916 to adjust a shutter speed of the high resolution camera 914. Similarly, the aperture adjuster 932 can be mechanical and/or digital. The aperture adjuster 932 can be engaged by the controller 916 to adjust an aperture of the high resolution camera 914. The focal length adjuster 934 can also be mechanical and/or digital. The focal length adjuster 934 can be engaged by the controller 916 to adjust a focal length of the high resolution camera 914.

The inertia measurement unit 936 can be configured to determine how much a mobile apparatus (e.g., a cart) moves throughout an environment, such as a retail environment (e.g., a store), what movements are made by the mobile apparatus, where the mobile apparatus has moved, orientation of the mobile apparatus relative to shelves and other structures or locations in the environment, and depth of field or distance between a shelf and the mobile apparatus. Accordingly, the inertia measurement unit 936 can determine orientation, speed, direction of gravity, and direction of movement relative to the direction of gravity for the mobile apparatus. The inertia measurement unit 936 can include a gyroscope 938 and an accelerometer 940 to detect movement of the mobile apparatus and make the abovementioned determinations.

The indoor location device 942 can be an upward facing camera that determines a location of the mobile apparatus in the environment based on what lights are detected in the ceiling of the environment by the indoor location device 942. For example, the indoor location device 942 can detect lights that are emitted from lightbulbs in the ceiling of the environment and can identify those lights in a lookup table that associates the lights with locations in the environment. The indoor location device 942 can then triangulate a location of the mobile apparatus based on correlating the locations for the lights that are identified via the lookup table. Sometimes, the mobile apparatus may not have the indoor location device 942 and can instead employ a different location positioning system to determine a current location of the mobile apparatus in the environment. For example, the mobile apparatus can utilize Bluetooth beacons or other global positioning devices and signals.

The depth sensor 944 can detect signals or other data that can be used by the controller 916 or the cart controller 902 to determine a depth or distance between the mobile apparatus and a particular shelf, barcode, or other region of interest (ROI) in the environment. The depth sensor 944 can, for example, be a stereoscopic camera. The depth sensor 944 can also use LiDAR and/or infrared sensors to detect depth or distance between the mobile apparatus and a particular shelf, barcode, or ROI.

The RFID sensor 946 can be used to detect and identify inventory conditions for one or more products. When locations in the retail environment are used for storing soft goods or other products that do not have definitive physical structures (e.g., clothes, towels, curtains, etc.), RFID sensor 946 readings can be used to determine whether the soft goods are out of stock. After all, image data may not be as effective in identifying out of stock conditions for products that do not have definitive physical structures that can be identified in image data. As an illustrative example, the indoor location device 942 or another indoor location system can detect current location of the mobile apparatus. When the device 942 detects that the mobile apparatus is located in a region where soft goods are typically stocked, the indoor location device 942 can send a notification to one of the controllers 902 and 916 to engage the RFID sensor 946. When the RFID sensor 946 is engaged, the RFID sensor 946 can capture RFID signal data at the mobile apparatus's current location. Such RFID signal data can be used by the cart controller 902 to determine whether there is an out of stock condition at the current location, instead of using image data captured by the high resolution camera 914.

The light source 948 can be selectively actuated and controlled by the cart controller 902. For example, the cart controller 902 can analyze one or more images captured by the low resolution cameras 912 and/or the high resolution camera 914 to determine whether the environment is too dark. If the images are dark, grainy, and/or blurry, the cart controller 902 can determine that the light source 948 should be actuated to illuminate an area that is imaged by the high resolution camera 914. The light source 948 can be an LED light. The light source 948 can also be an infrared light, a red light, or one or more other types of lights that the high resolution camera 914 is sensitive to. Actuating the light source 948 can be advantageous when the high resolution camera 414 is moving at a speed that causes the captured images to appear blurry and/or grainy.

The output indicator 950 can be configured to output can indication of whether components described herein are operating properly. The output indicator 950 can receive indications from one or more of the components described herein that indicates whether operations are being properly executed. The output indicator 950 can then output, for example, differently colored lights to demonstrate to a user of the mobile apparatus (e.g., a store employee) that the components of the mobile apparatus are functioning properly. For example, the output indicator 950 can output a green light to indicate that the components are operating correctly. The output indicator 950 can output a red light to indicate that one or more components are not working properly, thereby informing the user of the mobile apparatus that they should check the components of the mobile device to resolve the issue.

The power source 952 can be a battery (e.g., rechargeable, replaceable, removable) or other source that powers the components of the mobile apparatus. The power source 952 can be part of or integrated into the mobile apparatus. The power source 952 can also be attached to and in communication with components of the mobile apparatus described above.

Figure 10:
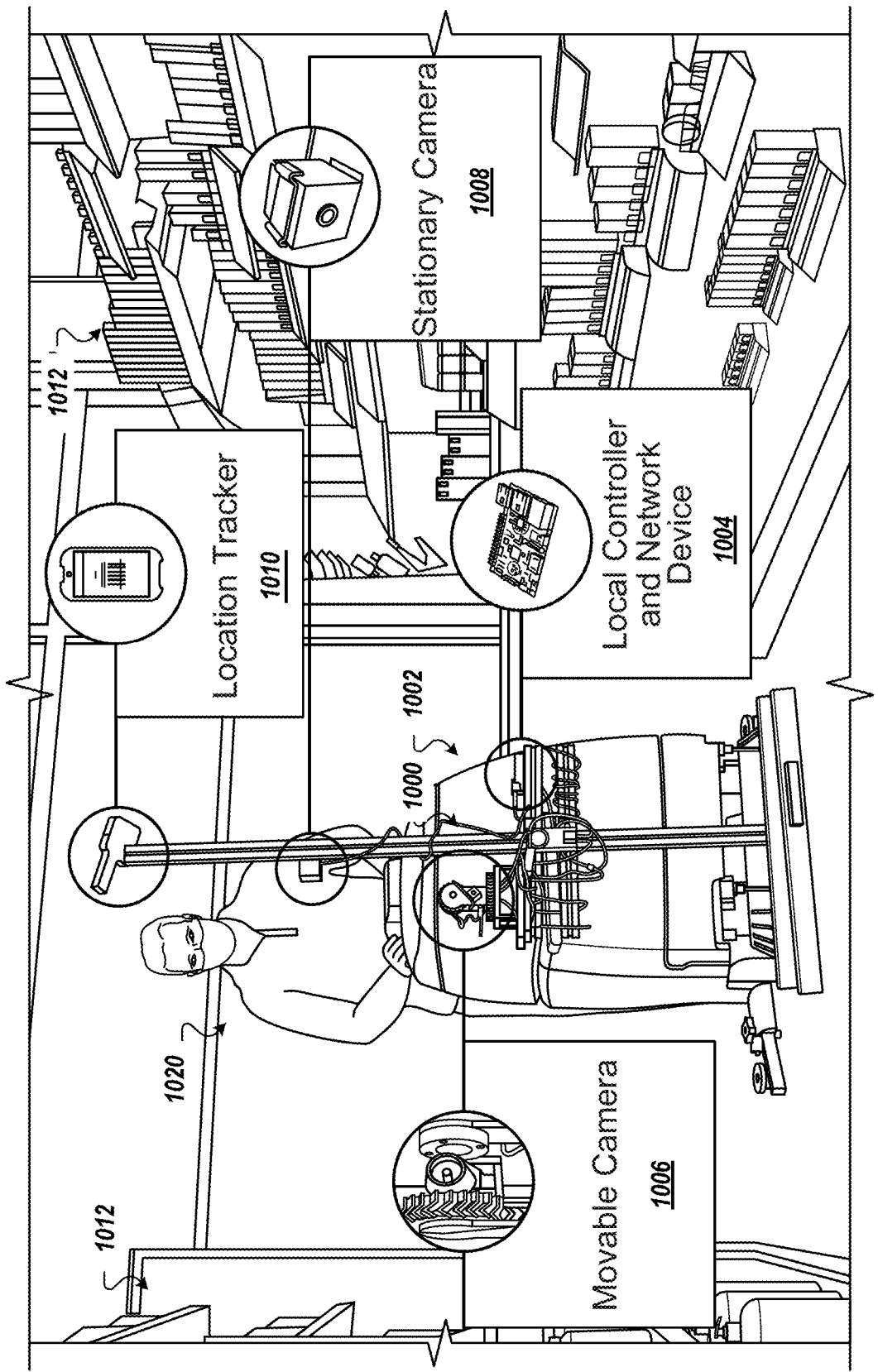
FIGS. 10 and 11 depict an example apparatus affixed to a floor sweeping machine to detect physical inventory conditions.
Figure 11:
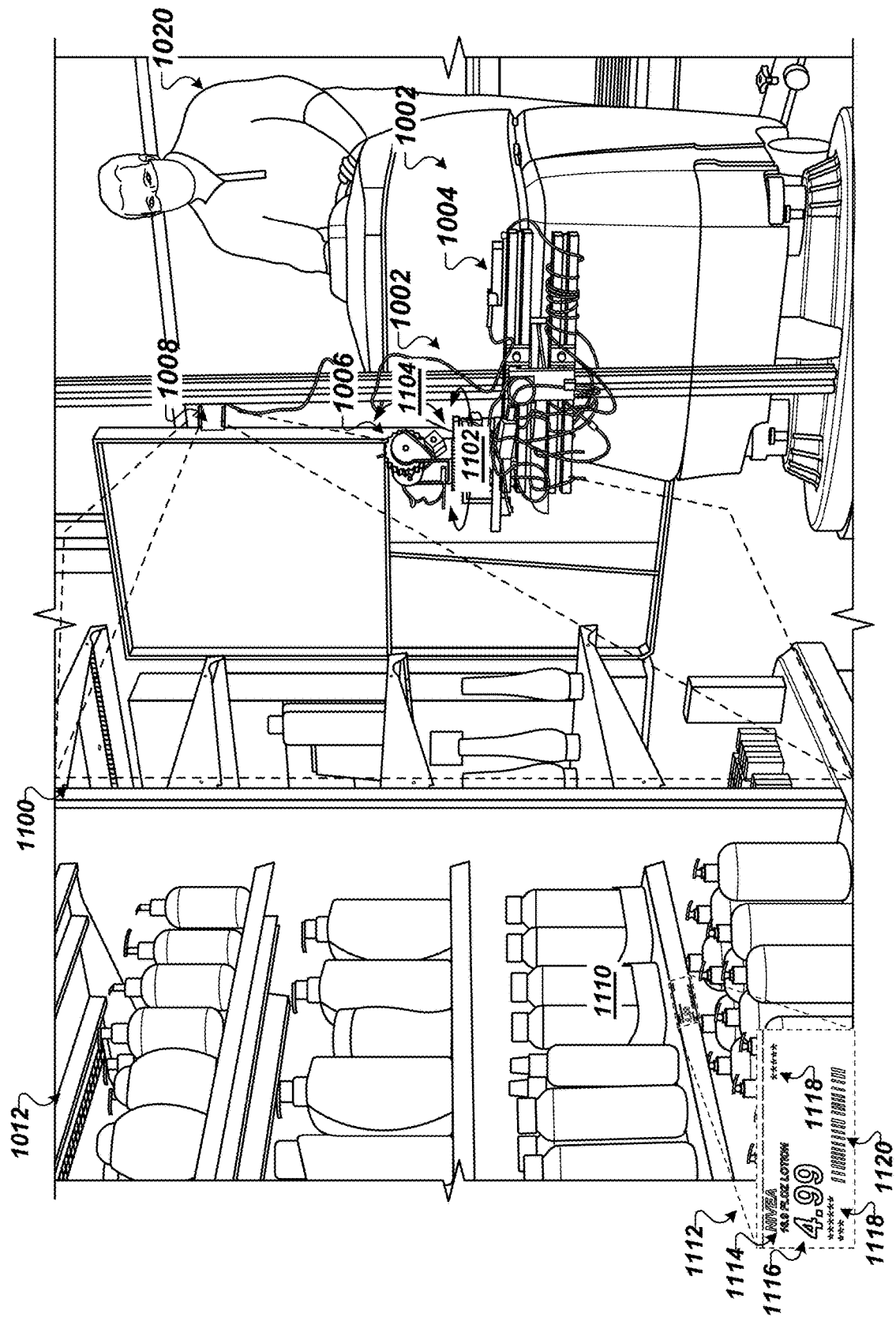

FIGS. 10 and 11 depict an example apparatus 1000 affixed to a floor sweeping machine 1002 to detect physical inventory conditions. The example apparatus 1000 can be similar to the apparatus discussed above with regard to FIG. 8. For example, the apparatus 1000 can include a local controller and network device 1004 (similar to the controller 108), a movable camera 1006 (similar to the movable camera 112), and a stationary camera 1008 (similar to the fixed camera 110).

The apparatus 1000 is also depicted as including a location tracker 1010, which can be communicatively coupled (e.g. wired connection, wireless connection) to the controller 1004 to provide information identifying a current location of the apparatus 1000, such as the location of the apparatus 1000 within an interior space, global positioning coordinates (e.g., GPS coordinates), and/or other location information. The controller 1004 can be configured to use the location information for any of a variety of purposes, such as using it in combination with images from the cameras 1006 and/or 1008 to detect stock conditions for products on shelves 1012, and/or using it to report the location where the stock conditions are detected (e.g., reporting stock condition for product with location of apparatus 1000 when condition detected).

The apparatus 1000 is depicted as being attached to a floor sweeping machine 1002 that is manually operated by an operator 1020. The apparatus 1000 can automatically detect and report stock conditions in the shelves 1012 without any input or direction from the operator 1020. Additionally, the apparatus 1000 can detect and report stock conditions in the shelves 1012 passively and without altering the normal operation of the floor sweeping machine 1002.

The apparatus 1000 is depicted with the movable camera 1006 and the stationary camera 1008 being positioned along a common vertical plane, with the stationary camera 1008 being positioned above the movable camera 1006. Other arrangements are also possible, such as the movable camera 1006 being positioned above the stationary camera 1008, the movable camera 1006 and the stationary camera 1008 being positioned side-by-side along a common horizontal plane, and/or other configurations. The stationary camera 1008 may be positioned at a height and orientation that permits for it to capture an image of the full height of the shelves 1012 when the machine 1002 is at one or more target distances from the shelves 1012. For example, referring to FIG. 11, the stationary camera 1008 can be positioned so as to have a field of view 1100 that captures the full height of the shelves 1012.

Still referring to FIG. 11, the movable camera 1006 can have one or more axes of rotation that can provide the example ranges of motion 1102 and 1104. For example, the movable camera 1006 can perform a pan motion 1102 permitting the movable camera 1006 to capture images forward or backward along the shelf 1012 relative to the current location of the machine 1002. The movable camera 1006 can also perform a tilt motion 1104 that can permit capturing images of different vertical positions of the shelf 1012.

An example out of stock condition is depicted at location 1110, which the controller 1004 can detect using the images from the stationary camera 1008. The location 1110 can have a corresponding label 1112 that the controller 1004 can identify and analyze using images from the movable camera 1006 to identify the product that is out of stock. The label can include any of a variety of information that identifies an intended product for location 1110, including a product name and manufacturer 1114, a product price 1116, numerical product identifiers 1118 (e.g., UPC code, retail store identifier, manufacturer identifier), and/or a barcode 1120 that identifies the product (e.g., barcode 1120 encodes numerical product identifiers in optically readable set of symbols).

Figure 12:
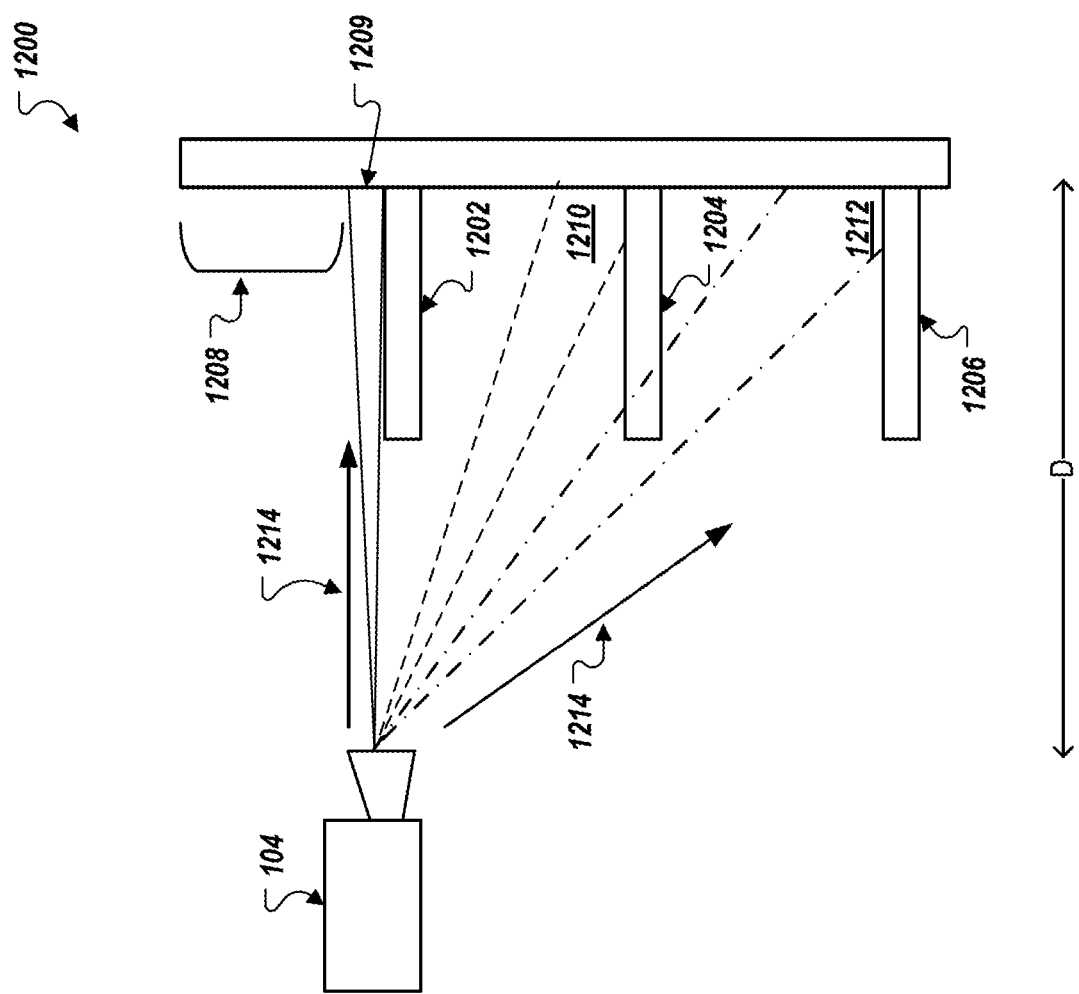
FIG. 12 shows an example camera capturing image data of shelves in a retail environment.

FIG. 12 shows an example camera 104 capturing image data of shelves 1202, 1204, and 1206 in a retail environment 1200. The camera 104 can be configured to a cart or other mobile apparatus, as described above. As the camera 104 is moved down an aisle in the retail environment 1200, the camera 104 can be trained on the shelves 1202, 1204, and 1206 and configured to capture images of the shelves. These images can then be used (e.g., by the computer system 102) to determine out of stock conditions of the shelves 1202, 1204, and 1206.

Gaps may exist between bottoms of shelves and backs of shelves because the camera 104 is not always going to have a straight on view of every shelf Depending on an angle of the camera 104 relative to a shelf, size of the gaps can vary. For example, if the camera 104 is straight on with a shelf (e.g., angled at or close to 180 degrees relative to the shelf), then smaller the gap between the bottom of the shelf and the top of the shelf in image data captured of the shelf by the camera 104. Moreover, the farther away the camera 104 is from the shelf, the smaller the gap. On the other hand, the larger the angle of the camera 104 relative to a shelf and the farther away from that shelf, the larger the gap between the bottom of the shelf and the top of the shelf in image data of the shelf.

The gap can be defined as a buffer region, which can be ignored when processing the image data so as to more accurately approximate where a back of a shelf actually starts in the image data. Therefore, the computer system 102 can determine (e.g., approximate) the buffer region based on the camera 104's angle relative to the shelf and distance away from the shelf. The computer system 102 can then ignore/isolate the buffer region when analyzing the image data to determine an out of stock condition at the particular shelf. This can be beneficial to reduce false positives that may occur if the computer system 102 misidentifies a back of a shelf to include more pixels in the image data than it actually does. Instead, using the techniques described herein, anything beyond the buffer region can be analyzed and processed by the computer system 102 to determine whether enough of the actual back of the shelf is visible to warrant a determination that the shelf has an out of stock condition.

The buffer region can be identified based on a distance D of the camera 104 from the shelves 1202, 1204, and 1206, and an angle of the camera 104 relative to the shelves 1202, 1204, and 1206. As shown in FIG. 12, the camera 104 has a field of view 1214, which includes all of the shelves 1202, 1204, and 1206. The camera 104 is positioned on a horizontal plane instead of being tilted up or down at one or more different angles. In some implementations, the camera 104 can be positioned at different angles. In some implementations, the camera 104 can also move between one or more different angles (e.g., the camera 104 can pan or tilt).

Here, the camera 104 is almost straight on (e.g., horizontal plane, 180 degrees) with the shelf 1202. As a result, a gap 1209 (e.g., buffer region) between the bottom of the shelf 1202 and a back of the shelf 1202 can be very small in image data that the camera 104 captures of the shelf 1202. When the buffer region 1209 is isolated, the image data of the shelf 1202 can include a larger region 1208 of the back of the shelf 1202.

The camera 104's field of view 1214 is slightly angled from the shelf 1204 in comparison to the shelf 1202. As a result, less of a back of the shelf 1204 may be visible from the camera 104's angle and distance away from the shelf 1204. Thus, a buffer region 1210 associated with the shelf 1204 can be larger than the buffer region 1209 of the shelf 1202 (e.g., refer to FIG. 13).

The camera 104's field of view is even more angled from the shelf 1206 in comparison to the shelves 1202 and 1204. As a result, even less of a back of the shelf 1206 is visible from the camera 104's angle and distance away from the shelf 1204. Thus, a buffer region 1212 associated with the shelf 1206 can be larger in the image data than the buffer region 1210 of the shelf 1204 and the buffer region 1209 of the shelf 1202.

Figure 13:
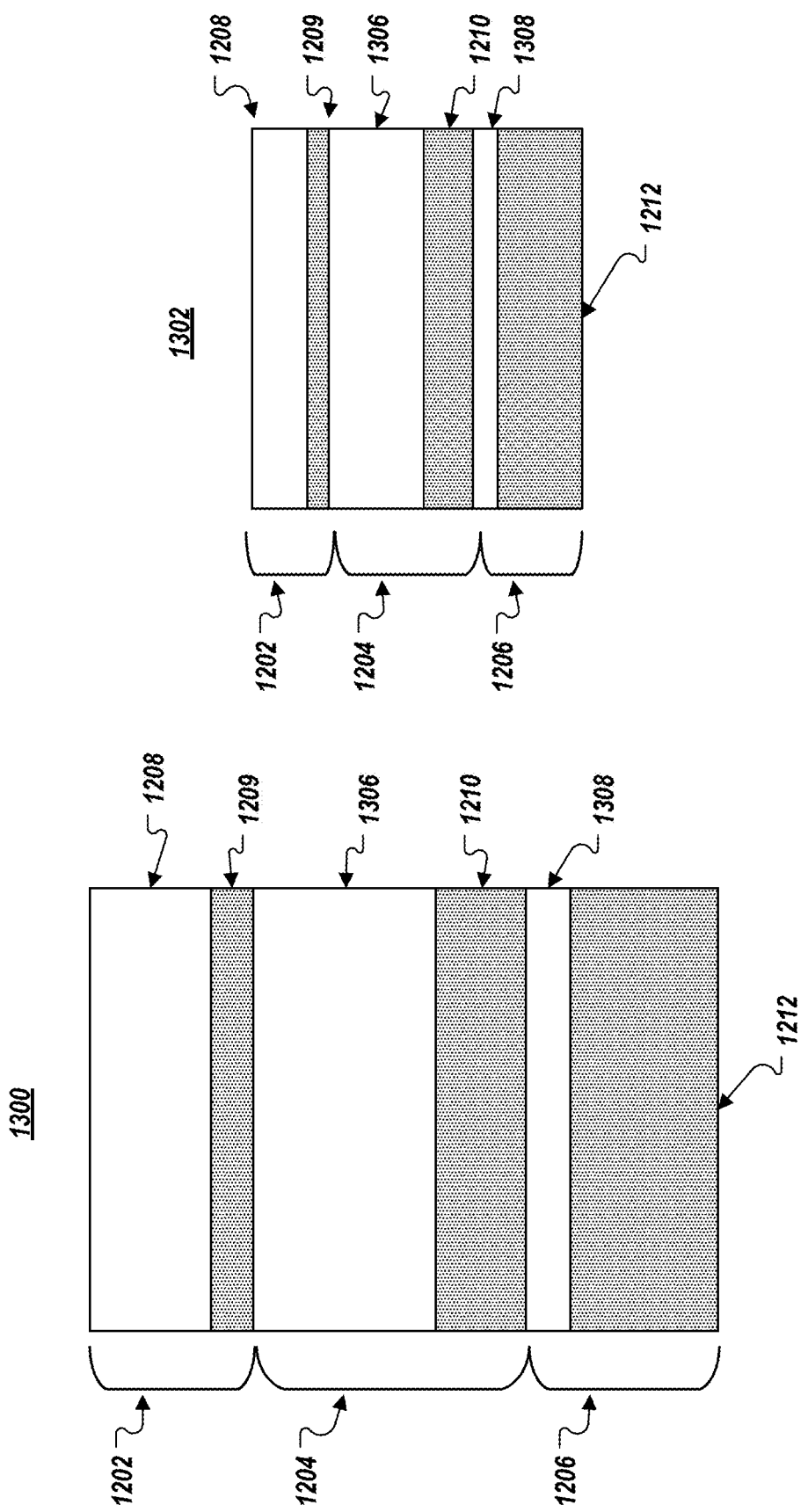
FIG. 13 depicts example data used in analyzing images of the shelves in FIG. 13.

FIG. 13 depicts example data used in analyzing images of the shelves in FIG. 12. Image data 1300 depicts the shelves 1202, 1204, and 1206 as imaged by the camera 104 when the camera 104 is a first distance away from the shelves. When the camera 104 is closer to (e.g., less distance away from) the shelves 1202, 1204, and 1206, the buffer regions 1209, 1210, and 1212 can appear larger, as shown in the image data 1300. The buffer regions 1209, 1210, and 1212 can comprise more pixels in the image data 1300.

On the other hand, when the camera 104 of FIG. 12 is at a second distance away from the shelves 1202, 1204, and 1206, where the second distance is less than the first distance, the buffer regions 1209, 1210, and 1212 can appear smaller, as shown in image data 1302. The buffer regions 1209, 1210, and 1212 in the image data 1302 therefore comprise fewer pixels than in the image data 1400 taken by the camera 104 from the first distance.

Furthermore, as shown in FIG. 13, back of shelf regions 1208, 1306, and 1308 appear larger in the image data 1300 than in the image data 1302 because of the distance of the camera 104 from the shelves 1202, 1204, and 1206.

In the image data 1300 taken from the first distance, which is closer to the shelves than the second distance, the back of the shelf 1208 of the shelf 1202 appears larger in pixel size relative to the buffer region 1209 of the shelf 1202. This is attributed to the angle of the camera 104 relative to the shelf 1202 and the first distance. The back of shelf 1306 of the shelf 1204 also appears larger than the buffer region 1210, although the buffer region 1210 is larger than the buffer region 1209 of the shelf 1202. The shelf 1204 can also have a taller height than the shelf 1202. Finally, the back of the shelf 1308 of the shelf 1206 appears smaller than the buffer region 1212, which is attributed to angle of the camera 104 relative to the shelf 1206. The shelf 1206 can also have a smaller height than the shelf 1204 but may be a same or similar height as the shelf 1202. The image data 1302 is scaled down in size from the image data 1300 since the image data 1302 is captured by the camera 104 from the second distance, which is greater than (e.g., farther away from the shelves) the first distance.

Figure 14:
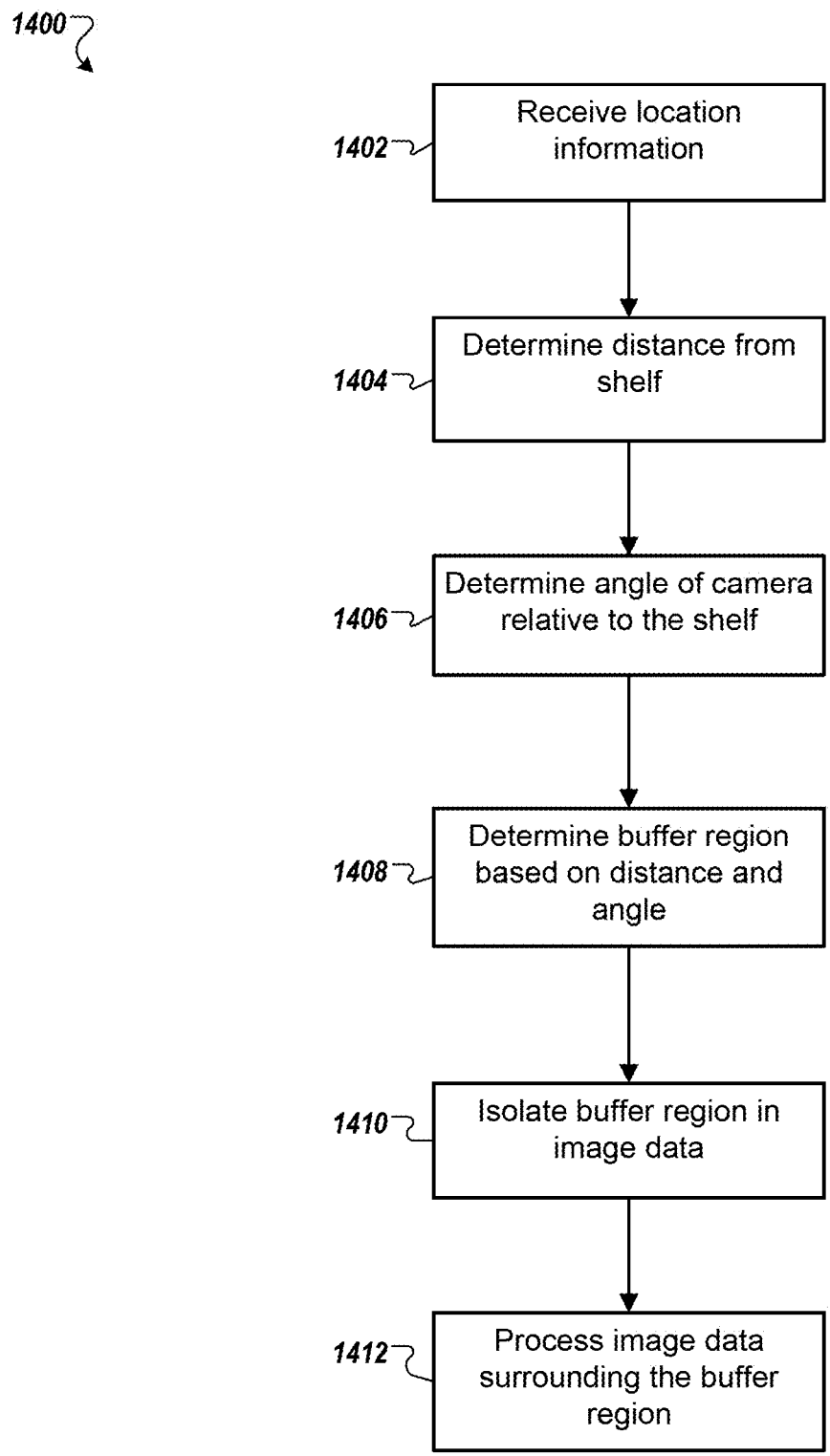
FIG. 14 is a flowchart of an example process for determining a buffer region in image data of a shelf.

FIG. 14 is a flowchart of an example process 1400 for determining a buffer region in image data of a shelf. The process 1400 can be performed by the computer system 102, however, another system or systems can be used to perform the process 1400 or similar processes. For illustrative purposes, the process 1400 is described from a perspective of a computer system.

Referring to the process 1400, the computer system receives location information in 1402. The location information can be received from a camera (e.g., the camera 104) and/or a component of the mobile apparatus or cart that detects movement of the mobile apparatus or cart. For example, the component can be an inertia measurement unit having an accelerometer and/or gyroscope, as described below. The component can also be an indoor locating system or other tracking system that is used in a physical environment where the mobile apparatus or cart is located. The location information can indicate a region in the physical environment where the mobile apparatus (and camera) is located. The location information can also indicate a speed at which the mobile apparatus is moving, images captured by low resolution cameras on the mobile apparatus, where the images can be used to determine distance and/or positioning of the mobile apparatus relative to the shelf. The location information can also include GPS coordinates or other positioning information indicating movement and/or location of the mobile apparatus relative to the shelf.

In 1404, the computer system determines a distance away from a shelf. The computer system can use the location information to determine or approximate the distance between the mobile apparatus (and the camera) and the shelf. As an example, if the location information includes image data, the computer system can process the image data using one or more machine learning models to measure an approximate distance of the mobile apparatus from the shelf.

For example, the computer system can determine distance away using multiple images (e.g., 2 images). The computer system can receive images from stereoscopic cameras. The stereoscopic cameras can be positioned side-by-side on the mobile apparatus. The computer system can compare the stereoscopic images to determine how aligned imaged features appear in the images. For example, where the features appear further apart or less closely aligned, the computer system determines that the mobile apparatus is closer to the shelf than when the same products appear more closely aligned in the images.

As another example, the computer system can determine distance away based on motion information. The computer system can receive indoor positioning information from components such as an inertia measurement unit that is part of the mobile apparatus. The indoor positioning information can include motion and speed information of the mobile apparatus. Since the camera is maintained at a consistent height, the computer system can determine distance away based on motion of the camera and speed at which the camera (on the mobile apparatus) is moving. Using this motion information, the computer system can compare the images captured at different times and determine the distance away.

As yet another example, the computer system can determine distance away and depth using disparity maps.

The computer system then determines an angle of the camera relative to the shelf (1406). The angle of the camera can already be known, as the camera can be calibrated in a fixed position. Since the camera is in a fixed position, the computer system can look at a vertical field of view of the camera, depth in images captured by the camera, and pixels appearing in those images to determine the angle of the camera. The computer system can also determine the angle using the location information. For example, if the location information includes image data, the computer system can process the image data using one or more machine learning models or other programing techniques to measure an approximate angle at which the image data is captured.

In 1408, the computer system determines a buffer region based on the distance and angle determinations. The computer system can, for example, determine an area of the image data that is expected to be empty. The computer system can estimate a size of a lower portion of the image data (which may represent the empty area), by determining a distance away from the shelf. The distance away from the shelf can be determined from LIDAR readings and/or identifying and triangulating overlapping portions of image data from multiple cameras. Trigonometric functions can then be executed to calculate an actual, physical size of the empty space on the shelf using the determined distance value. For example, a function can include multiplying cosin of the angle from the shelf by the distance value, where the distance value can represent a multiplier for shelf size.

As described above, a size of the buffer region (e.g., number of pixels) can vary depending on the distance of the camera from the shelf as well as the angle of the camera relative to the shelf. The greater the angle and the farther away, the larger the buffer region (e.g., the more pixels in the image data that will be ignored by the computer system when processing the image data). The smaller the angle and the closer to the shelf, the smaller the buffer region (e.g., the fewer pixels in the image data that will be ignored by the computer system).

The computer system isolates the buffer region in image data captured by the camera in 1410. Isolating the buffer region can include ignoring the buffer region when processing the image data. After all, the buffer region represents pixels in the image data that may not accurately depict part of a back of the shelf. Thus, by ignoring the buffer region, the computer system can reduce false positives that may arise if the computer system processes the image data without ignoring the buffer region.

The computer system processes the image data surrounding the buffer region (1412). The computer system can, for example, process regions of the image data appearing above the buffer region. Such regions can more accurately approximate the back of the shelf in the image data. These regions can therefore be processed to determine whether sufficient backing of the shelf is visible to warrant an out of stock determination to be made for the particular shelf.

Figure 15A:
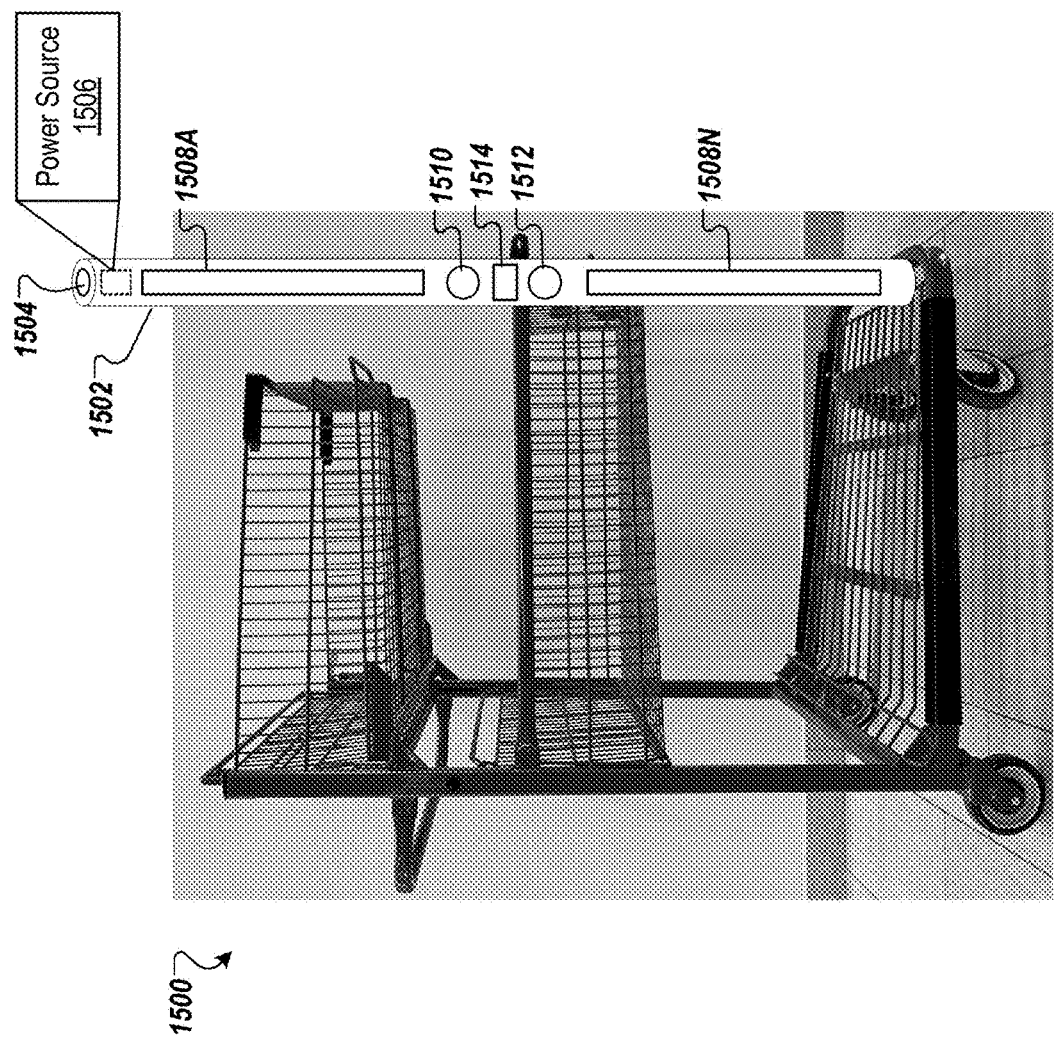
FIGS. 15A-B show example configurations of an apparatus on a cart to detect inventory conditions.
Figure 15B:
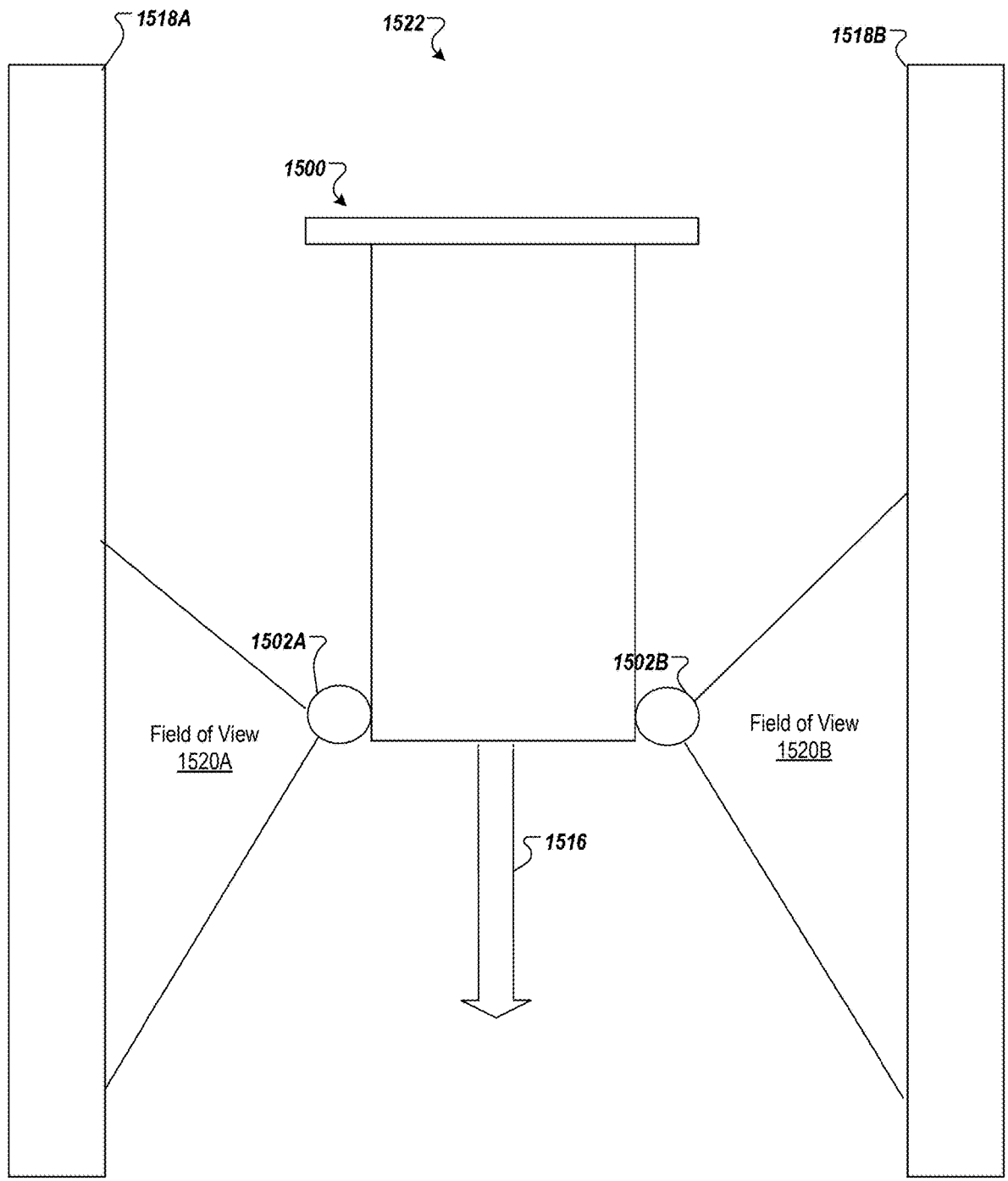

FIGS. 15A-B show example configurations of an apparatus 1502 on a cart 1500 to detect inventory conditions. FIG. 15A depicts a side view of the apparatus 1502 on the cart 1500. FIG. 15B depicts a top down view of the apparatus 1502 on the cart 1500 as the cart 1500 moves through a physical environment, such as a retail store. It shall be noted that the apparatus 1502 is mobile and a user of any size and/or build can attach the apparatus 1502 to a cart, such as the cart 1500, and remove the apparatus 1502 from the cart. The apparatus 1502 can, for example, be lightweight and may include one or more clamps to attach the apparatus 1502 to a side or sides of the cart 1500. Additionally, the user can attach any quantity of the apparatus 1502 to the cart 1500. For example, an apparatus 1502 can be placed at each corner of the cart 1500. As shown in FIG. 15B, an apparatus 1502 can be placed at each front corner of the cart 1500. One or more apparatus 1502 can also be placed along sides of the cart 1500. Moreover, in some implementations, the apparatus 1502 can be clamped or otherwise mounted to one or more tiers (e.g., baskets) of the cart 1500, such as a bottom tier, a middle tier, and a top tier. As shown in FIG. 15A, for example, the apparatus 1502 can be mounted to furthest corners of the bottom tier of the cart 1500 so as to reduce any potential awkwardness for users who are using the cart 1500 (e.g., loading products into the cart 1500, removing products from the cart 1500, etc.). As another example, the apparatus 1502 can be mounted to a far right or far left side of a handle at the back of the cart 1500 to make the cart 1500 easy to operate by the users.

Referring to FIG. 15A, the apparatus 1502 can be a vertical pole that attaches to a portion of the cart 1500. For example, the apparatus 1502 can attach to one or more corners of the cart 1500, such as at a front right and/or a front left corner of the cart 1500. The apparatus 1502 can also be attached anywhere along right and/or left sides of the cart 1500 in some implementations. One or more of the components described herein in the system can be integrated into or otherwise attached to the apparatus 1502.

The apparatus 1502 may include an indoor location device 1504, one or more lights 108A-N, a high resolution camera 1510, a low resolution camera 1512, an output indicator 1514, and a power source 1506. One or more of 1504, 108A-N, 1510, 1512, 1514, and 1506 can be optional. Moreover, the components 1504, 108A-N, 1510, 1512, 1514, and 1506 can be arranged in any desired configuration.

The indoor location device 1504 can be positioned at a top of the apparatus 1502 and pointed upwards towards a ceiling of the retail environment. As described above, the indoor location device 1504 can be an upward facing camera, configured to detect a location of the cart 1500 based on identifying lights in the ceiling of the retail environment. One or more other location positioning methods can be used to determine a current location of the cart 1500 in the retail environment.

One or more of the lights 1508A-N can be configured along a length of the apparatus 1502. The lights 1508A-N can be selectively actuated (e.g., by a cart controller, not depicted in FIGS. 15A-B) to illuminate an area that is imaged by the cameras 1510 and/or 1512. In the example apparatus 1502 of FIG. 15A, there are two lights 1508A-N. The light 1508A is positioned from a top portion of the apparatus 1502 to a midpoint of the apparatus 1502. The light 1508N is positioned from slightly below the midpoint of the apparatus 1502 to a bottom portion of the apparatus 1502. As a result, the lights 1508A-N can illuminate an entire length/height of shelves or another region in the retail environment that may be imaged by the high resolution camera 1510 and/or the low resolution camera 1512. One or more other arrangements of the lights 1508A-N can be utilized. Moreover, the lights 1508A-N can include infrared lights. In some implementations, the lights 1508A-N can be white lights or other visible lights.

The high resolution camera 1510 can be a PTZ camera or other movable camera as described throughout this disclosure. The low resolution camera 1512 can be a fixed camera as described throughout this disclosure. The output indicator 1514 can output a light or other signal that can be viewed by a user of the cart 1500. The signal can indicate whether components of the apparatus 1502 are functioning properly. For example, if the high resolution camera 1510 is unable to adjust one or more movements (e.g., pan, tilt, zoom, focal length, aperture, shutter speed, etc.), then the camera 1510 can transmit a notification to the cart controller and/or the high resolution camera controller (not depicted in FIG. 15A). The controller can instruct the output indicator 1514 to output a red light, which can indicate to the user that one or more components of the apparatus 1502 are not functioning properly. The user can then service or otherwise check the components. The output indicator 1514 can output a green light whenever components described herein are functioning properly. As mentioned, one or more other indicators can be outputted to depict operational stratus of components in the apparatus 1502 and/or the cart 1500.

Finally, the power source 1506 can be integrated into the apparatus 1502. The power source 1506 can also be external to the apparatus 1502 and communicably coupled to one or more components of the apparatus 1502. The power source 1506 can be replaceable, and/or rechargeable. For example, the power source 1506 can be a rechargeable battery that can be charged and/or replaced when it is lower on power and may no longer provide enough power to one or more of the components in the apparatus 1502. In some implementations, the power source 1506 can plug into an outlet or other power source for charging purposes. When the power source 1506 is plugged in, the apparatus 1502 can be assumed to be outside of a main usage mode. The main usage mode can be when the cart 1500 is moving around an environment and images are being captured of the environment. During the main usage mode, only some image data may be transmitted to another computer system as described throughout this disclosure. For example, only image data demonstrating empty spots on shelves, price discrepancies, etc. can be transmitted to the computer system for further processing. Other image data, which can be used for training purposes or other algorithms implemented in the environment can then be transmitted to the computer system when the apparatus 1502 is not in the main usage mode. When not in the main usage mode (for example, the apparatus 1502 can be in batch mode), any and/or all data that is captured by components of the apparatus 1502 can be packaged and transmitted to the computer system described throughout this disclosure for further processing and analysis of out of stock conditions. Therefore, while the power source 1506 is charging, larger batches of data can be transmitted across networks.

Refer to FIG. 9 for further discussion about the components of the apparatus 1502.

Referring to FIG. 15B, the cart 1500 can be moving in an environment 1522. The environment 1522 can be a retail environment, such as a store, as described previously. The cart 1500 can be pushed by a user, such as a store employee. The cart 1500 can also be autonomously operated (e.g., by a robot) and can automatically move throughout the environment 1522. The cart 1500 can move in the environment 1522 and pass shelves 1518A and 1518B. The shelves 1518A and 1518B can include products, that can be in stock or out of stock, as described herein.

In the example of FIG. 15B, the cart 1500 includes two apparatuses 1502A and 1502B. Each of the apparatuses 1502A and 1502B are vertical poles that are attached to front corners of the cart 1500. The apparatuses 1502A and 1502B are described further in FIG. 15A. As the cart 1500 moves in direction 1516, cameras along each of the apparatuses 1502A and 1502B can capture image data of the respective shelves 1518A and 1518B in their respective fields of view 1520A and 1520B.

As an illustrative example, a high resolution camera on the apparatus 1502A can be configured to pan left and right (or perform other operations) to capture image data of the shelf 1518A in the camera's field of view 1520A while the cart 1500 is moving past the shelf 1518A. Similarly, a high resolution camera on the apparatus 1502B can be configured to tilt and zoom (or perform other operations) to capture image data of the shelf 1518B in the camera's field of view 1520B while the cart 1500 is moving past the shelf 1518B.

In some implementations, the cameras on the apparatuses 1502A and 1502B can be operated simultaneously by the cart controller and/or one or more high resolution camera controllers. In some implementations, only components of one of the apparatuses 1502A and 1502B may be selectively controlled and/or operated. In yet some implementations, components of the apparatus 1502A can be selectively controlled while components of the apparatus 1502B are in a sleep mode or other mode in which they are not performing operations described throughout this disclosure.

In some implementations, where the cart 1500 only has one apparatus 1502A, the cart 1500 may move down the aisle such that the camera on the apparatus 1502A captures image data of the shelf 1518A in the field of view 1520A. The cart 1500 can then be turned around and may move in a direction opposite the direction 1516 such that the camera on the apparatus 1502A can capture image data of the shelf 1518B in the field of view 1520A.

Figure 16:
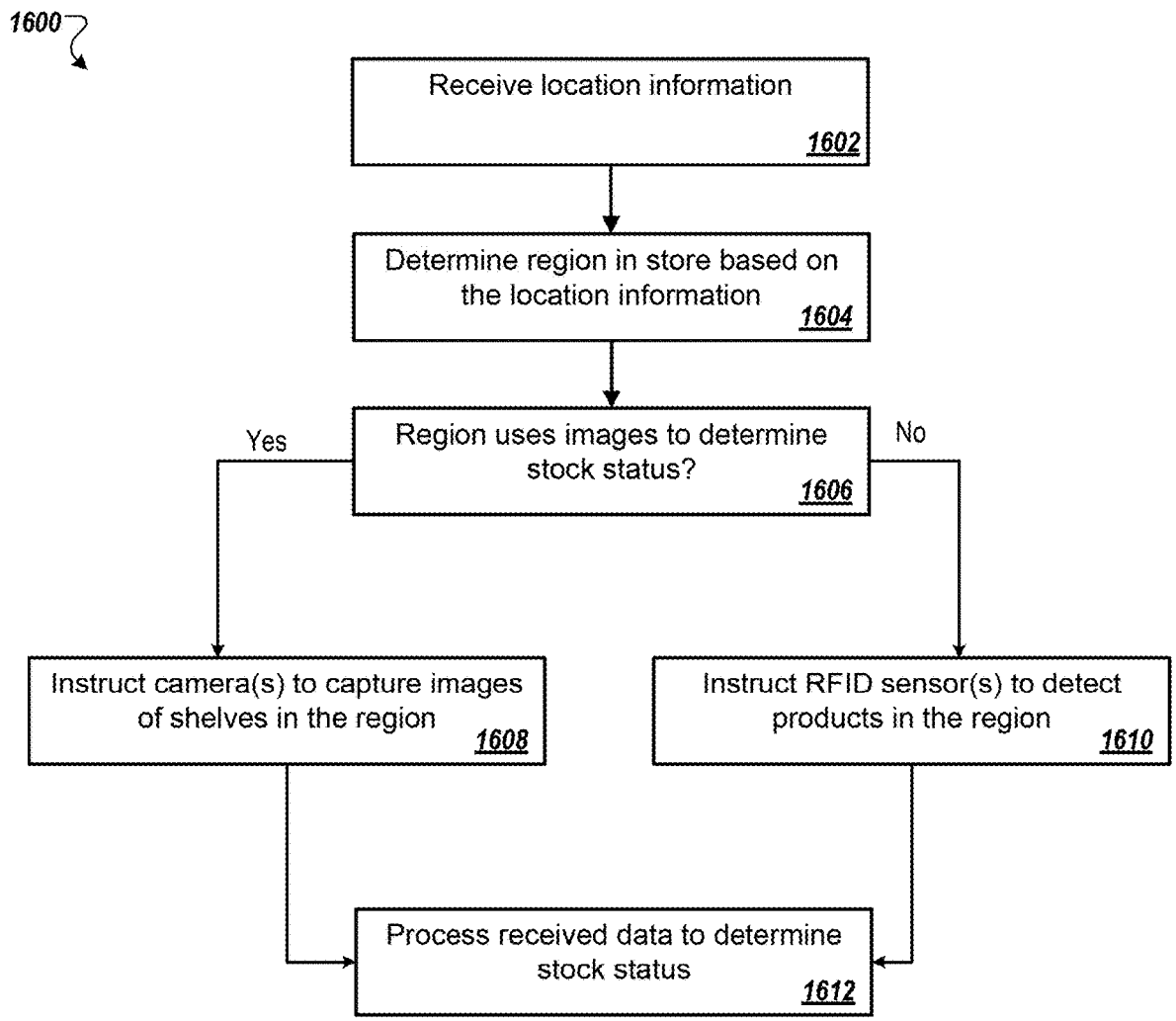
FIG. 16 is a flowchart of an example process for determining whether to use image data or RFID sensor data to detect inventory conditions.

FIG. 16 is a flowchart of an example process 1600 for determining whether to use image data or RFID sensor data to detect inventory conditions. In the process 1600, a cart such as the cart 106 or the cart 1500 can use a system 900 to collect image data and/or RFID sensor data that can be used for detecting inventory conditions. However, other devices and systems can be used to perform the process 1600 and other processes described throughout this disclosure.

Referring to the process 1600, location information is received 1602. For example, the cart controller depicted and described in reference to FIG. 9 can receive location information from one or more components, such as the indoor location device, the inertia measurement unit, one or more of the low resolution cameras, a depth sensor, and/or one or more other devices or sensors that may be positioned throughout an environment where the cart (e.g., mobile apparatus) is located. In some implementations, the cart controller can receive sensor data that can be utilized by the cart controller to determine location information (e.g., a current location) of the cart.

Next, the cart controller determines a region in the store where the cart is located based on the location information (1604). The cart controller can, for example, compare the location information to information in a lookup table. The lookup table can correlate locations (e.g., GPS coordinates, other location-based signals) to actual regions in the environment, such as departments (e.g., groceries, electronics, clothes, furniture, etc.), particular aisles, etc.

The cart controller determines whether the region uses images to determine stock status in 1606. The lookup table can also associate each region with type of products/items and preference for image data or RFID sensor data. Databases or other structured files can also contain associations between regions in the environment and type of data that can be used for determining stock status.

When the products have definite physical structures, image data can be preferred since physical shapes of the products can be more accurately extracted from the image data to determine whether a particular shelf has an out of stock condition. On the other hand, products that do not have definite physical structures may be more challenging to analyze for stock status using image data. As a result, RFID sensor data can be preferred for use in determining a stock status of those products.

As an illustrative example, boxes of cereal can be easily detected from image data for having definite, rigid structures. Those definite, rigid structures can be more easily identified and extracted from an image that contains the cereal boxes on a shelf. On the other hand, clothes can be folded and stacked on a shelf, but sometimes, the stacks of clothes may not have a uniform or definite shape or structure. Clothes can be stacked or heaped on top of each other and may form less definite shapes such as piles of fabric. As a result, identifying the clothes in image data can be more challenging. Instead, RFID sensor data can be used to determine how much of items such as clothes are located on their respective shelf and whether there is an out of stock condition.

If the region uses images for determining stock status, then the cart controller instructs one or more of the cameras to capture images of the shelves in the region (1608). In other words, the region contains products that typically have definitive physical structures. The region can be a cereal and breakfast aisle in a grocery store, by way of example.

Once the camera(s) captures images of the shelf, the camera(s) transmits the image data to the cart controller. The cart controller processes the received data as described throughout this disclosure to determine stock status (1612).

If the region uses RFID sensor data for determining stock status, then the cart controller instructs one or more RFID sensor devices to detect products in the region (1610). In other words, the region contains products that typically have non-definitive physical structures. The region can be a clothing department in a retail store, by way of example.

In some implementations, the RFID sensor devices may be continuously capturing the RFID sensor data regardless of performance of 1602-1606 described above. Therefore, in 1610, the cart controller can simply determine that the RFID sensor data should be used to determine stock status and thus request the RFID sensor data from the RFID sensor devices for use in the determination. In some implementations, the RFID sensor devices may only be turned on and instructed to capture the RFID sensor data when the cart is in a region that does not use images to determine stock status (1606).

Moreover, in some implementations, the cameras may not be continuously capturing images. Rather, the cart controller can selectively turn on the cameras in 1608 when the cart controller determines that the region is one in which image data should be used for determining stock status. Only activating the cameras when they are needed for stock status determinations can save processing power and compute resources. Once the cart controller determines that the cart is located in a region of the store that does not need image data for stock status determinations, the cart controller can turn off the cameras or otherwise instruct the cameras to stop capturing images. Similarly, if the cart controller determines that the cart is standing idle (e.g., the cart has not moved for at least a predetermined period of time), the cart controller can instruct the cameras to stop capturing images to save on power consumption, processing power, and compute resources.

In some implementations, the cameras can be configured to continuously capture images as the cart moves throughout the store, however the images may not all be used for stock status determinations. The images can be continuously captured and if the cart controller determines in 1606 that the region uses images to determine stock status, then the cart controller can request the images of the region from the cameras and use just those images for this determination. Once the cart is standing idle or is plugged in and charging, as described in reference to FIGS. 15A-B, the cart controller can request, from the cameras, all of the images that were captured while the cart was moving. All of the images can then be used by the cart controller or another computer system for other processing and/or analysis of conditions in the store.

Once the RFID sensor(s) detect product data, the sensor(s) transmits the sensor data to the cart controller. The cart controller processes the received data as described throughout this disclosure to determine stock status (1612).

Figure 17:
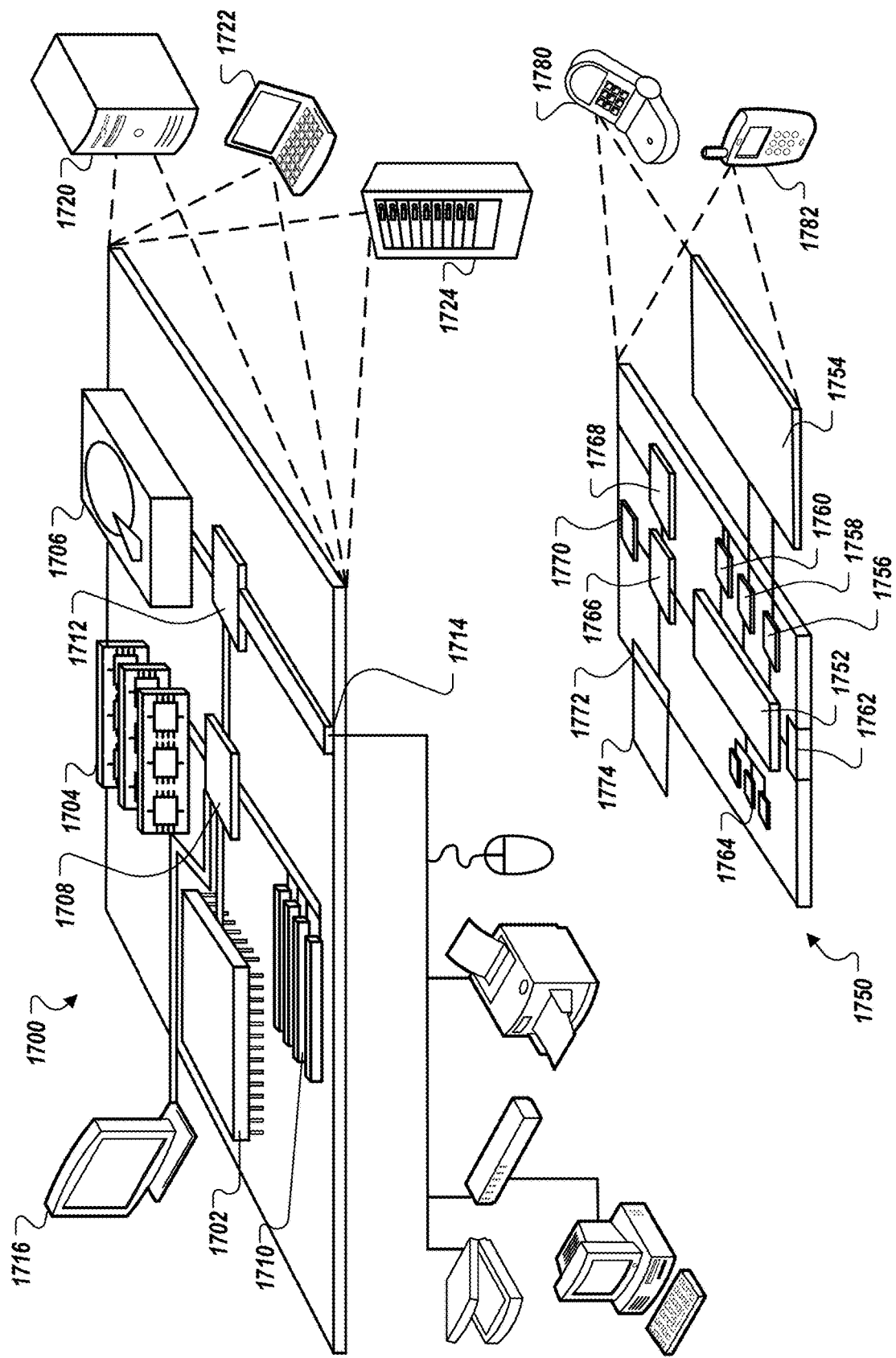
FIG. 17 is a schematic diagram that shows an example of a computing device and a mobile computing device.

FIG. 17 shows an example of a computing device 1700 and an example of a mobile computing device that can be used to implement the techniques described here. The computing device 1700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1700 includes a processor 1702, a memory 1704, a storage device 1706, a high-speed interface 1708 connecting to the memory 1704 and multiple high-speed expansion ports 1710, and a low-speed interface 1712 connecting to a low-speed expansion port 1714 and the storage device 1706. Each of the processor 1702, the memory 1704, the storage device 1706, the high-speed interface 1708, the high-speed expansion ports 1710, and the low-speed interface 1712, are interconnected using various busses, and can be mounted on a common motherboard or in other manners as appropriate. The processor 1702 can process instructions for execution within the computing device 1700, including instructions stored in the memory 1704 or on the storage device 1706 to display graphical information for a GUI on an external input/output device, such as a display 1716 coupled to the high-speed interface 1708. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1704 stores information within the computing device 1700. In some implementations, the memory 1704 is a volatile memory unit or units. In some implementations, the memory 1704 is a non-volatile memory unit or units. The memory 1704 can also be another form of computer-readable medium, such as a magnetic or optical disk.

The storage device 1706 is capable of providing mass storage for the computing device 1700. In some implementations, the storage device 1706 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1704, the storage device 1706, or memory on the processor 1702.

The high-speed interface 1708 manages bandwidth-intensive operations for the computing device 1700, while the low-speed interface 1712 manages lower bandwidth-intensive operations. Such allocation of functions is exemplary only. In some implementations, the high-speed interface 1708 is coupled to the memory 1704, the display 1716 (e.g., through a graphics processor or accelerator), and to the high-speed expansion ports 1710, which can accept various expansion cards (not shown). In the implementation, the low-speed interface 1712 is coupled to the storage device 1706 and the low-speed expansion port 1714. The low-speed expansion port 1714, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1700 can be implemented in a number of different forms, as shown in the figure. For example, it can be implemented as a standard server 1720, or multiple times in a group of such servers. In addition, it can be implemented in a personal computer such as a laptop computer 1722. It can also be implemented as part of a rack server system 1724. Alternatively, components from the computing device 1700 can be combined with other components in a mobile device (not shown), such as a mobile computing device 1750. Each of such devices can contain one or more of the computing device 1700 and the mobile computing device 1750, and an entire system can be made up of multiple computing devices communicating with each other.

The mobile computing device 1750 includes a processor 1752, a memory 1764, an input/output device such as a display 1754, a communication interface 1766, and a transceiver 1768, among other components. The mobile computing device 1750 can also be provided with a storage device, such as a micro-drive or other device, to provide additional storage. Each of the processor 1752, the memory 1764, the display 1754, the communication interface 1766, and the transceiver 1768, are interconnected using various buses, and several of the components can be mounted on a common motherboard or in other manners as appropriate.

The processor 1752 can execute instructions within the mobile computing device 1750, including instructions stored in the memory 1764. The processor 1752 can be implemented as a chipset of chips that include separate and multiple analog and digital processors. The processor 1752 can provide, for example, for coordination of the other components of the mobile computing device 1750, such as control of user interfaces, applications run by the mobile computing device 1750, and wireless communication by the mobile computing device 1750.

The processor 1752 can communicate with a user through a control interface 1758 and a display interface 1756 coupled to the display 1754. The display 1754 can be, for example, a TFT (Thin-Film-Transistor Liquid Crystal Display) display or an OLED (Organic Light Emitting Diode) display, or other appropriate display technology. The display interface 1756 can comprise appropriate circuitry for driving the display 1754 to present graphical and other information to a user. The control interface 1758 can receive commands from a user and convert them for submission to the processor 1752. In addition, an external interface 1762 can provide communication with the processor 1752, so as to enable near area communication of the mobile computing device 1750 with other devices. The external interface 1762 can provide, for example, for wired communication in some implementations, or for wireless communication in other implementations, and multiple interfaces can also be used.

The memory 1764 stores information within the mobile computing device 1750. The memory 1764 can be implemented as one or more of a computer-readable medium or media, a volatile memory unit or units, or a non-volatile memory unit or units. An expansion memory 1774 can also be provided and connected to the mobile computing device 1750 through an expansion interface 1772, which can include, for example, a SIMM (Single In Line Memory Module) card interface. The expansion memory 1774 can provide extra storage space for the mobile computing device 1750, or can also store applications or other information for the mobile computing device 1750. Specifically, the expansion memory 1774 can include instructions to carry out or supplement the processes described above, and can include secure information also. Thus, for example, the expansion memory 1774 can be provide as a security module for the mobile computing device 1750, and can be programmed with instructions that permit secure use of the mobile computing device 1750. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1764, the expansion memory 1774, or memory on the processor 1752. In some implementations, the computer program product can be received in a propagated signal, for example, over the transceiver 1768 or the external interface 1762.

The mobile computing device 1750 can communicate wirelessly through the communication interface 1766, which can include digital signal processing circuitry where necessary. The communication interface 1766 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1768 using a radio-frequency. In addition, short-range communication can occur, such as using a Bluetooth, WiFi, or other such transceiver (not shown). In addition, a GPS (Global Positioning System) receiver module 1770 can provide additional navigation- and location-related wireless data to the mobile computing device 1750, which can be used as appropriate by applications running on the mobile computing device 1750.

The mobile computing device 1750 can also communicate audibly using an audio codec 1760, which can receive spoken information from a user and convert it to usable digital information. The audio codec 1760 can likewise generate audible sound for a user, such as through a speaker, e.g., in a handset of the mobile computing device 1750. Such sound can include sound from voice telephone calls, can include recorded sound (e.g., voice messages, music files, etc.) and can also include sound generated by applications operating on the mobile computing device 1750.

The mobile computing device 1750 can be implemented in a number of different forms, as shown in the figure. For example, it can be implemented as a cellular telephone 1780. It can also be implemented as part of a smart-phone 1782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. An apparatus for determining an out of stock condition on a shelf, the apparatus comprising:
a camera in data communication with one or more processors;
the one or more processors;
a mobile power source providing power to the camera and to the one or more processors;
a network interface for sending and receiving messages with physically remote destinations over a data network; and
computer memory storing instructions that, when executed by the one or more processors, cause the one or more processors to perform operations comprising:
receiving image data from the camera comprising a plurality of pixel locations, each pixel location being uniquely addressed in the image data and storing a pixel value captured by the camera at that location;
generating a backing map comprising a plurality of cell locations, each cell location being uniquely addressed in the backing map and sharing a unique address with a corresponding pixel location in the image data, each cell location storing a backing value being an empty value if the pixel value is classified as showing the backing of a shelf and the backing value being a nonempty value if the pixel value is classified as not showing the backing of the shelf;
determining, in the backing map, a shelf area representing a location of a shelf captured by the camera; identifying, in the backing map, an empty area by finding an area above the shelf area containing a threshold number of cell locations storing the empty value;
determining a shelf-identifier for a shelf that is empty of items based on the empty area in the backing map; and
generating, using the shelf-identifier, instructions to restock the shelf that is empty of items.

2. The apparatus of claim 1, wherein the operations further comprise:

identifying a barcode target area in the shelf area based on the location of the empty area; and
reading, in the image data, a barcode located in the image data based on the location of the barcode target area in the shelf area.

3. The apparatus of claim 1, wherein the operations further comprise:
transmitting to an inventory server system through the network interface an empty-shelf message that includes the shelf-identifier.

4. The apparatus of claim 1, wherein generating the backing map comprises:
for each cell location:
accessing the pixel value of the corresponding pixel location with the cell location's unique address;
generating a backing value by providing, to a classifier, the pixel value of the corresponding pixel location;
receiving, from the classifier, the backing value; and
recording, in the cell location, the backing value.

5. The apparatus of claim 4, wherein generating a backing value by providing, to a classifier, the pixel value of the corresponding pixel location further comprises providing the image data and the unique address of the cell location;
wherein the classifier is configured to generate the backing value using a model that receives, as input, at least i) the pixel value of the corresponding pixel location and ii) other pixel values in the image data other than the pixel value of the corresponding pixel location based on the unique address.

6. The apparatus of claim 4, wherein generating a backing value by providing, to a classifier, the pixel value of the corresponding pixel location further comprises providing a facility location that defines i) where in a facility the image data was captured and ii) item location data that specifies shelves in the facility and objects to be stored on the shelves in the facility; and
wherein the classifier is configured to generate the backing value using a model that receives, as input, at least i) the pixel value of the corresponding pixel location and ii) objects to be stored near the facility location that defines where in a facility the image data was captured.

7. The apparatus of claim 4, wherein the classifier is a machine-learning classifier.

8. The apparatus of claim 7, wherein the apparatus is in data communication with a server system configured to:
receive records of false-empty results;
generate supplemental training data from the records of false-empty results; and
retrain the classifier using the supplemental training data.

9. The apparatus of claim 8, wherein to retrain the classifier using the supplemental training data, the server system is configured to retrain the classifier using at least some original training data that was used to train the classifier in generating the false-empty results.

10. The apparatus of claim 1, further comprising:
a fixed camera being fixedly mounted on the cart at a first angle;
wherein the camera is a high resolution camera being controllably mounted on the cart, the high resolution camera configured to capture high resolution images and to engage at least one of pan, tilt, and zoom operations in response to engagement instructions received from a high resolution camera controller; and
a high resolution camera controller configured to:

receive high resolution camera instructions; and responsive to receiving the high resolution camera instructions, send the engagement instructions to the high resolution camera;
wherein the operations further comprise:
receiving, from the fixed camera, first image data that captures a first inventory object;
determining, from the first image data, a spatial location of a first inventory object;
generating high resolution camera instructions that are configured to cause the high resolution camera to capture the first inventory object;
transmitting the high resolution camera instructions to the high resolution camera controller;
and receiving, from the high resolution camera, the image data.

11. The apparatus of claim 10, wherein:
the high resolution camera is configured to operate in a plurality of modes, the plurality of modes comprising at least i) a sleep mode and ii) a working mode, wherein the working mode consumes more power than the sleep mode, and the high resolution camera controller is configured to transition, in response to receiving the high resolution camera instructions, the high resolution camera from the sleep mode to the working mode and to later transition the high resolution camera from the working mode to the sleep mode after the image data is received from the high resolution camera.

12. A method for determining an out of stock condition on a shelf, the method comprising:
receiving, by a computing system, image data from a camera comprising a plurality of pixel locations, each pixel location being uniquely addressed in the image data and storing a pixel value captured by a camera at that location;
generating, by the computing system, a backing map comprising a plurality of cell locations, each cell location being uniquely addressed in the backing map and sharing a unique address with a corresponding pixel location in the image data, each cell location storing a backing value being an empty value if the pixel value is classified as showing the backing of a shelf and the backing value being a nonempty value if the pixel value is classified as not showing the backing of the shelf;
determining, by the computing system and in the backing map, a shelf area representing a location of the shelf captured by the camera; identifying, by the computing system and in the backing map, an empty area by finding an area above the shelf area containing a threshold number of cell locations storing the empty value;
determining, by the computing system, a shelf-identifier for a shelf that is empty of items based on the empty area in the backing map; and generating, by the computing system and using the shelf-identifier, instructions to restock the shelf that is empty of items.

13. The method of claim 12, the method further comprising:
identifying, by the computing system, a barcode target area in the shelf area based on the location of the empty area; and
reading, by the computing system and in the image data, a barcode located in the image data based on the location of the barcode target area in the shelf area.

14. The method of claim 12, the method further comprising:
transmitting, by the computing system and to an inventory server system, an empty-shelf message that includes the shelf-identifier.

15. The method of claim 12, wherein generating, by the computing system, the backing map comprises:
for each cell location:
accessing the pixel value of the corresponding pixel location with the cell location's unique address;
generating a backing value by providing, to a classifier, the pixel value of the corresponding pixel location;
receiving, from the classifier, the backing value; and
recording, in the cell location, the backing value.

16. The method of claim 15, wherein the classifier is a machine-learning classifier.

17. A system for determining an out of stock condition on a shelf, the system comprising:
one or more processors; and computer memory storing instructions that, when executed by the one or more processors, cause the one or more processors to perform operations comprising:
receiving image data comprising a plurality of pixel locations, each pixel location being uniquely addressed in the image data and storing a pixel value captured by a camera at that location;
generating a backing map comprising a plurality of cell locations, each cell location being uniquely addressed in the backing map and sharing a unique address with a corresponding pixel location in the image data, each cell location storing a backing value being an empty value if the pixel value is classified as showing the backing of a shelf and the backing value being a nonempty value if the pixel value is classified as not showing the backing of the shelf;
determining, in the backing map, a shelf area representing a location of the shelf captured by the camera; and
identifying, in the backing map, an empty area by finding an area above the shelf area containing a threshold number of cell locations storing the empty value;
determining a shelf-identifier for a shelf that is empty of items based on the empty area in the backing map; and
generating, using the shelf-identifier, instructions to restock the shelf that is empty of items.

18. The system of claim 17, the operations further comprising:
identifying a barcode target area in the shelf area based on the location of the empty area; and
reading, in the image data, a barcode located in the image data based on the location of the barcode target area in the shelf area.

19. The system of claim 17, the operations further comprising:
transmitting, to an inventory server system, an empty-shelf message that includes the shelf-identifier.

20. The system of claim 17, wherein generating the backing map comprises: for each cell location: accessing the pixel value of the corresponding pixel location with the cell location's unique address;
generating a backing value by providing, to a classifier, the pixel value of the corresponding pixel location;
receiving, from the classifier, the backing value; and
recording, in the cell location, the backing value.

* * * * *